US010565557B2

(12) United States Patent
Suzuki et al.

(10) Patent No.: US 10,565,557 B2
(45) Date of Patent: Feb. 18, 2020

(54) SYSTEM AND CONTROL METHOD THEREFOR

(71) Applicant: CANON KABUSHIKI KAISHA, Tokyo (JP)

(72) Inventors: Yuusuke Suzuki, Kawasaki (JP); Nozomu Ogawa, Tokyo (JP); Yousuke Sugai, Kawasaki (JP); Naohiro Iwata, Yokohama (JP); Taiki Mouri, Tokyo (JP); Takahiro Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 374 days.

(21) Appl. No.: 15/372,915

(22) Filed: Dec. 8, 2016

(65) Prior Publication Data

US 2017/0178225 A1 Jun. 22, 2017

(30) Foreign Application Priority Data

Dec. 18, 2015 (JP) .................................. 2015-248030

(51) Int. Cl.
G06Q 10/10 (2012.01)
G06Q 30/06 (2012.01)
(Continued)

(52) U.S. Cl.
CPC ......... *G06Q 10/10* (2013.01); *G06Q 30/0641* (2013.01); *H04N 1/00344* (2013.01);
(Continued)

(58) Field of Classification Search
CPC ............... G06Q 30/0641; G06Q 10/10; H04N 1/00344; H04N 1/32122; H04N 1/32539;
(Continued)

(56) References Cited

U.S. PATENT DOCUMENTS 6,370,341 B1 4/2002 Haines
6,937,999 B1* 8/2005 Haines ................... G06Q 30/06
399/10
(Continued)

FOREIGN PATENT DOCUMENTS

CN 101520873 A 9/2009
CN 103329090 A 9/2013
(Continued)

OTHER PUBLICATIONS

Maruyama, Kazutaka, and Takayuki Sekiya. "ECCS2012 Makes PCs and Printers in Computer Labs Accessible from Off-Campus Environment." (2013).*

(Continued)

Primary Examiner — Asfand M Sheikh
(74) Attorney, Agent, or Firm — Venable LLP

(57) ABSTRACT

In the system, the image forming apparatus includes a unit that sends the status information of the image forming apparatus to the management server, and a unit that requests the web service provided by the service server to register device information, and the service server includes a unit that register and manage user information of a user of the web service provided by the service server, a unit that, in response to a request from the image forming apparatus, registers the device information of the image forming apparatus and user information managed in association with each other, and a unit that issues, to the user of the image forming apparatus that is registered with the web service, a notification related to the image forming apparatus, using the status information provided by the management server.

16 Claims, 15 Drawing Sheets

(51) Int. Cl.
   *H04N 1/00* (2006.01)
   *H04N 1/32* (2006.01)
(52) U.S. Cl.
   CPC ..... *H04N 1/32122* (2013.01); *H04N 1/32539* (2013.01); *H04N 2201/0072* (2013.01); *H04N 2201/0094* (2013.01); *H04N 2201/3205* (2013.01)
(58) Field of Classification Search
   CPC ... H04N 2201/0072; H04N 2201/0094; H04N 2201/3205
   See application file for complete search history.

(56) References Cited

U.S. PATENT DOCUMENTS

| | | | |
|---|---|---|---|
| 7,259,882 B2 | 8/2007 | Tsuda et al. | |
| 7,907,302 B2 | 3/2011 | Tsuda et al. | |
| 8,005,725 B2* | 8/2011 | Takahashi | G06Q 10/087 705/26.1 |
| 8,213,039 B2 | 7/2012 | Tsuda et al. | |
| 8,405,864 B2 | 3/2013 | Tsuda et al. | |
| 8,526,037 B2* | 9/2013 | Emori | G06F 21/608 358/1.14 |
| 8,817,309 B2 | 8/2014 | Tsuda et al. | |
| 9,007,629 B2* | 4/2015 | Ozaki | G06F 3/1204 358/1.13 |
| 9,239,818 B2* | 1/2016 | Park | G06F 17/20 |
| 9,417,826 B2* | 8/2016 | Ochi | H04L 67/16 |
| 2003/0007175 A1 | 1/2003 | Tsuda et al. | |
| 2003/0093464 A1* | 5/2003 | Clough | G06F 8/60 709/203 |
| 2004/0215520 A1* | 10/2004 | Butler | G05B 23/0213 705/22 |
| 2005/0066163 A1* | 3/2005 | Ikenoya | H04L 63/0823 713/156 |
| 2005/0188225 A1* | 8/2005 | Ikenoya | H04L 63/0807 726/5 |
| 2005/0222915 A1* | 10/2005 | Wilson, Jr. | G06Q 10/107 705/27.1 |
| 2007/0067831 A1* | 3/2007 | Matsuda | G06F 21/33 726/5 |
| 2007/0279685 A1 | 12/2007 | Tsuda et al. | |
| 2008/0068647 A1* | 3/2008 | Isobe | H04N 1/00413 358/1.15 |
| 2008/0098104 A1* | 4/2008 | Kong | H04L 41/00 709/223 |
| 2009/0213418 A1* | 8/2009 | Kaneko | H04N 1/00344 358/1.15 |
| 2010/0241484 A1* | 9/2010 | Nichols | G06Q 10/06311 705/7.13 |
| 2011/0134480 A1 | 6/2011 | Tsuda et al. | |
| 2012/0243025 A1 | 9/2012 | Tsuda et al. | |
| 2012/0268769 A1 | 10/2012 | Kashioka | |
| 2012/0296769 A1* | 11/2012 | Ginster, II | G06Q 10/087 705/26.8 |
| 2013/0073690 A1* | 3/2013 | DeSalvo | H04L 67/125 709/219 |
| 2013/0191514 A1 | 7/2013 | Tsuda et al. | |
| 2013/0262033 A1* | 10/2013 | Henson | G06Q 30/01 702/183 |
| 2014/0211232 A1* | 7/2014 | Ganesan | G06F 3/1207 358/1.14 |
| 2015/0002889 A1* | 1/2015 | Takamoto | G06F 3/1237 358/1.15 |
| 2015/0003847 A1* | 1/2015 | Yang | G03G 15/556 399/27 |
| 2015/0019386 A1* | 1/2015 | Kimura | G03G 15/556 705/26.81 |
| 2016/0072975 A1* | 3/2016 | Fujioka | H04N 1/00854 358/1.14 |
| 2017/0186020 A1* | 6/2017 | Kodmer | G06Q 30/018 |
| 2017/0244866 A1* | 8/2017 | Kano | G06F 3/1239 |

FOREIGN PATENT DOCUMENTS

| | | | | |
|---|---|---|---|---|
| CN | 104118225 A | 10/2014 | | |
| CN | 104160341 A | 11/2014 | | |
| EP | 1206088 A2 * | 5/2002 | ......... | G06F 11/3013 |
| EP | 1206088 A2 | 5/2002 | | |
| EP | 1862964 A2 | 12/2007 | | |
| JP | 2001142984 A | 5/2001 | | |
| JP | 2003-022165 A | 1/2003 | | |
| JP | 2014021303 A | 2/2014 | | |

OTHER PUBLICATIONS

European Search Report dated Apr. 21, 2017, in European Patent Appln. No. 16204641.1.
European Office Search Report issued in corresponding European Application No. 16204641.1 dated Sep. 18, 2019.
Chinese Office Action issued in corresponding Chinese Application No. 201611143862.5 dated Apr. 2, 2019.

* cited by examiner

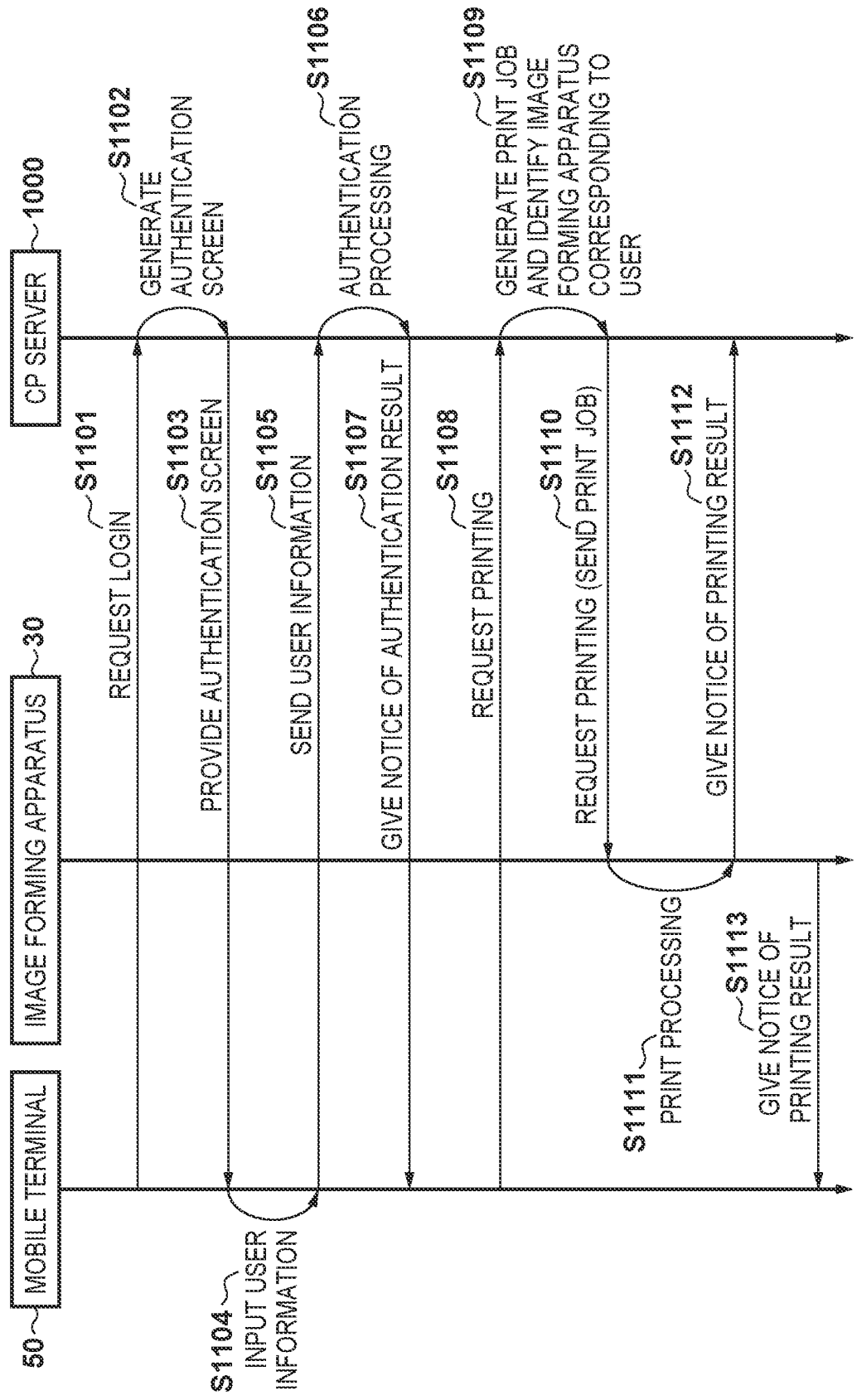

FIG. 12AA

[EC SERVER] USER MANAGEMENT TABLE

| USER ID | PASSWORD | USER NAME | NOTIFICATION DESTINATION (E-MAIL ADDRESS) | PHYSICAL ADDRESS | PAYMENT INFORMATION | DEVICE ID |
|---|---|---|---|---|---|---|
| ECU0001 | XXXXX00001 | XXXXX | XXXXXXXXXX@zzzz.ne.jp | | | ECD0001 |
| ECU0002 | YYYYY00002 | YYYYY | YYYYYYYYYY@zzzz.ne.jp | | | ECD0002 |

FIG. 12AB

[EC SERVER] DEVICE MANAGEMENT TABLE

| DEVICE ID | REGISTRATION ID | SERIAL NUMBER | STATUS INFORMATION |
|---|---|---|---|
| ECD0001 | | MFPXXXX01 | IN OPERATION |
| ECD0002 | | MFPXXXX02 | UNABLE TO COMMUNICATE |

FIG. 12AC

[EC SERVER] PRODUCT TABLE

| PRODUCT ID | PRODUCT TYPE | SERIAL NUMBER | MANUFACTURER |
|---|---|---|---|
| P00001 | PRINTER | PRYYYY01 | COMPANY A |
| P00002 | INK | INZZZZ01 | COMPANY A |

FIG. 12BA
[MANAGEMENT SERVER] DEVICE MANAGEMENT TABLE

| DEVICE ID | SERIAL NUMBER | MODEL ID | STATUS INFORMATION | PROVISION DESTINATION (SERVER ID) |
|---|---|---|---|---|
| MGD0001 | MFPXXXX01 | MGDM0001 | IN OPERATION | MGS0001 |
| MGD0002 | MFPXXXX02 | MGDM0001 | UNABLE TO COMMUNICATE | MGS0001 |
| MGD0003 | MFPXXXX03 | MGDM0001 | IN OPERATION | MGS0001 |

FIG. 12BB
[MANAGEMENT SERVER] SERVICE MANAGEMENT TABLE

| SERVICE ID | AUTHENTICATION INFORMATION | SEND DESTINATION (URL) |
|---|---|---|
| MGS0001 | MGSAAAAA01 | |
| MGS0002 | MGSBBBBB02 | |

FIG. 12BC
[MANAGEMENT SERVER] MODEL MANAGEMENT TABLE

| MODEL ID | CORRESPONDING CONSUMABLE (CONSUMABLE ID) |
|---|---|
| DM0001 | CON0001,CON0002 |
| DM0002 | CON0001,CON0002 |
| DM0003 | CON0003 |

FIG. 12BD
[MANAGEMENT SERVER] CONSUMABLE MANAGEMENT TABLE

| CONSUMABLE ID | CONSUMABLE TYPE | SIZE (MAXIMUM VOLUME) | MANUFACTURER |
|---|---|---|---|
| DM0001 | INK | 50 | COMPANY A |
| DM0002 | INK SET | C:50,M:50,Y:50,K:50 | COMPANY A |
| DM0003 | PAPER | 100 SHEETS | COMPANY A |

FIG. 12BE
[MANAGEMENT SERVER] USE HISTORY TABLE

| DEVICE ID | DETAILS OF USE | DATE/TIME OF USE | USER |
|---|---|---|---|
| MGD0001 | PROCESSING: PRINTING<br>NO. OF SHEETS CONSUMED: 1<br>AMOUNT OF INK CONSUMED: K:50 | 2015/1/10 | |
| MGD0001 | PROCESSING: PRINTING<br>NO. OF SHEETS CONSUMED: 3<br>AMOUNT OF INK CONSUMED: | 2015/1/11 | |
| MGD0001 | PROCESSING: PRINTING<br>NO. OF SHEETS CONSUMED: 1<br>AMOUNT OF INK CONSUMED: K:50 | 2015/1/14 | |

F I G. 12CA
[CONTENT SERVER] USER MANAGEMENT TABLE

| USER ID | PASSWORD | USER NAME | NOTIFICATION DESTINATION (E-MAIL ADDRESS) | PHYSICAL ADDRESS | PAYMENT INFORMATION |
|---|---|---|---|---|---|
| CU0001 | | | | | |
| CU0002 | | | | | |
| CU0003 | | | | | |
| CU0004 | | | | | |

F I G. 12CB
[CONTENT SERVER] CONTENT MANAGEMENT TABLE

| CONTENT ID | ALLOWED USERS | CONTENT INFORMATION (STORAGE LOCATION, ETC.) | CREATOR | DATE/TIMES OF CREATION | EXPIRATION DATE FOR USE |
|---|---|---|---|---|---|
| CC0001 | CU0001,CU0002,CU0003 | | | 2015/1/1 | 2020/12/31 |
| CC0002 | CU0004 | | | 2015/1/1 | 2020/12/31 |

F I G. 12CC
[CONTENT SERVER] CONTENT USE HISTORY TABLE

| CONTENT ID | USER (USER ID) | DATE/TIME OF USE |
|---|---|---|
| CC0001 | CU0001 | 2015/1/1 |
| CC0001 | CU0002 | 2015/1/3 |

FIG. 12DA
[CP SERVER] USER MANAGEMENT TABLE

| USER ID | PASSWORD | USER NAME | NOTIFICATION DESTINATION (E-MAIL ADDRESS) | PHYSICAL ADDRESS | PAYMENT INFORMATION | DEVICE ID |
|---|---|---|---|---|---|---|
| CPU0001 | XXXXX00001 | XXXXX | XXXXX@zzzz.ne.jp | | | CPD0001 |
| CPU0002 | YYYYY00002 | YYYYY | YYYYY@zzzz.ne.jp | | | CPD0002 |
| CPU0003 | ZZZZZ00003 | ZZZZZ | ZZZZZ@aaa.ne.jp | | | UNREGISTERED |
| CPU0004 | WWWWW00004 | WWWWW | WWWWW@aaa.ne.jp | | | UNREGISTERED |

FIG. 12DB
[CP SERVER] DEVICE MANAGEMENT TABLE

| DEVICE ID | REGISTRATION ID | SERIAL NUMBER | STATUS INFORMATION |
|---|---|---|---|
| CPD0001 | | MFPXXX01 | IN OPERATION |
| CPD0002 | | MFPXXX02 | UNABLE TO COMMUNICATE |

FIG. 12DC
[CP SERVER] PRINT JOB MANAGEMENT TABLE

| JOB ID | REQUESTER (USER ID) | SEND DESTINATION DEVICE (DEVICE ID) | JOB STATUS | DATE/TIME OF GENERATION |
|---|---|---|---|---|
| PJ0001 | CPU0001 | CPD0001 | NORMALLY ENDED | 2015/1/1 |
| PJ0002 | CPU0001 | CPD0001 | NORMALLY ENDED | 2015/1/1 |

SYSTEM AND CONTROL METHOD THEREFOR

BACKGROUND OF THE INVENTION

Field of the Invention

The present invention relates to a system and a control method therefor.

Description of the Related Art

Conventionally, electronic commerce (EC) services are available as web services on the Internet. EC services enable users to order and purchase goods from web sites. In using such EC services, user information (e.g., physical addresses and contact information) is registered.

Japanese Patent Laid-Open No. 2003-22165 discloses print processing that uses a server.

In Japanese Patent Laid-Open No. 2003-22165, no consideration is taken of collection of status information of an image forming apparatus and effective use of the collected information. This may indicate a failure to provide a service that makes effective use of collected status information of an image forming apparatus and information registered with services on a network.

SUMMARY OF THE INVENTION

According to one aspect of the present invention, there is provided a system, comprising: an image forming apparatus; a management server for managing status information of the image forming apparatus; and a service server for providing a web service, the management server including: a unit configured to obtain and managing the status information of the image forming apparatus, and a providing unit configured to provide the status information of the image forming apparatus to the service server, the image forming apparatus including: a sending unit configured to send the status information of the image forming apparatus to the management server, and a requesting unit configured to request the web service provided by the service server to register device information of the image forming apparatus, and the service server including: a management unit configured to register and managing user information of a user of the web service provided by the service server, a registration unit configured, in response to a request from the image forming apparatus, to register the device information of the image forming apparatus and user information managed by the management unit in association with each other, and a notification unit configured to issue, to the user of the image forming apparatus that is registered with the web service, a notification related to the image forming apparatus, using the status information provided by the management server.

According to another aspect of the present invention, there is provided a control method for a system that includes an image forming apparatus, a management server that manages status information of the image forming apparatus, and a service server that provides a web service, the control method comprising: in the management server, obtaining and managing the status information of the image forming apparatus; and providing the status information of the image forming apparatus to the service server; in the image forming apparatus, sending the status information of the image forming apparatus to the management server; and requesting the web service provided by the service server to register device information of the image forming apparatus; and in the service server, registering and managing user information of a user of the web service provided by the service server in a management unit; and in response to a request from the image forming apparatus, registering the device information of the image forming apparatus and user information managed in the management unit in association with each other; and issuing, to the user of the image forming apparatus that is registered with the web service, a notification related to the image forming apparatus, using the status information provided by the management server.

According to the present invention, a user can be provided with a service in which his/her user information registered with a service on a network is associated with information of an image forming apparatus owned by the user.

Further features of the present invention will become apparent from the following description of embodiments (with reference to the attached drawings).

BRIEF DESCRIPTION OF THE DRAWINGS

FIG. 11 shows a print sequence in a CPS according to the invention of the present application.

FIGS. 12AA, 12AB, and 12AC show examples of structures of tables managed by an EC server according to the invention of the present application.

FIGS. 12BA, 12BB, 12BC, 12BD, and 12BE show examples of structures of tables managed by a management server according to the invention of the present application.

FIGS. 12CA, 12CB, and 12CC show examples of structures of tables managed by the content server according to the invention of the present application.

FIGS. 12DA, 12DB, and 12DC show examples of structures of tables managed by the CP server according to the invention of the present application.

DESCRIPTION OF THE EMBODIMENTS

The following describes embodiments of the invention of the present application using the drawings. Each of the embodiments of the present invention described below can be implemented solely or as a combination of a plurality of the embodiments or features thereof where necessary or where the combination of elements or features from individual embodiments in a single embodiment is beneficial.

First Embodiment

[Overview of System]

Figure 1:
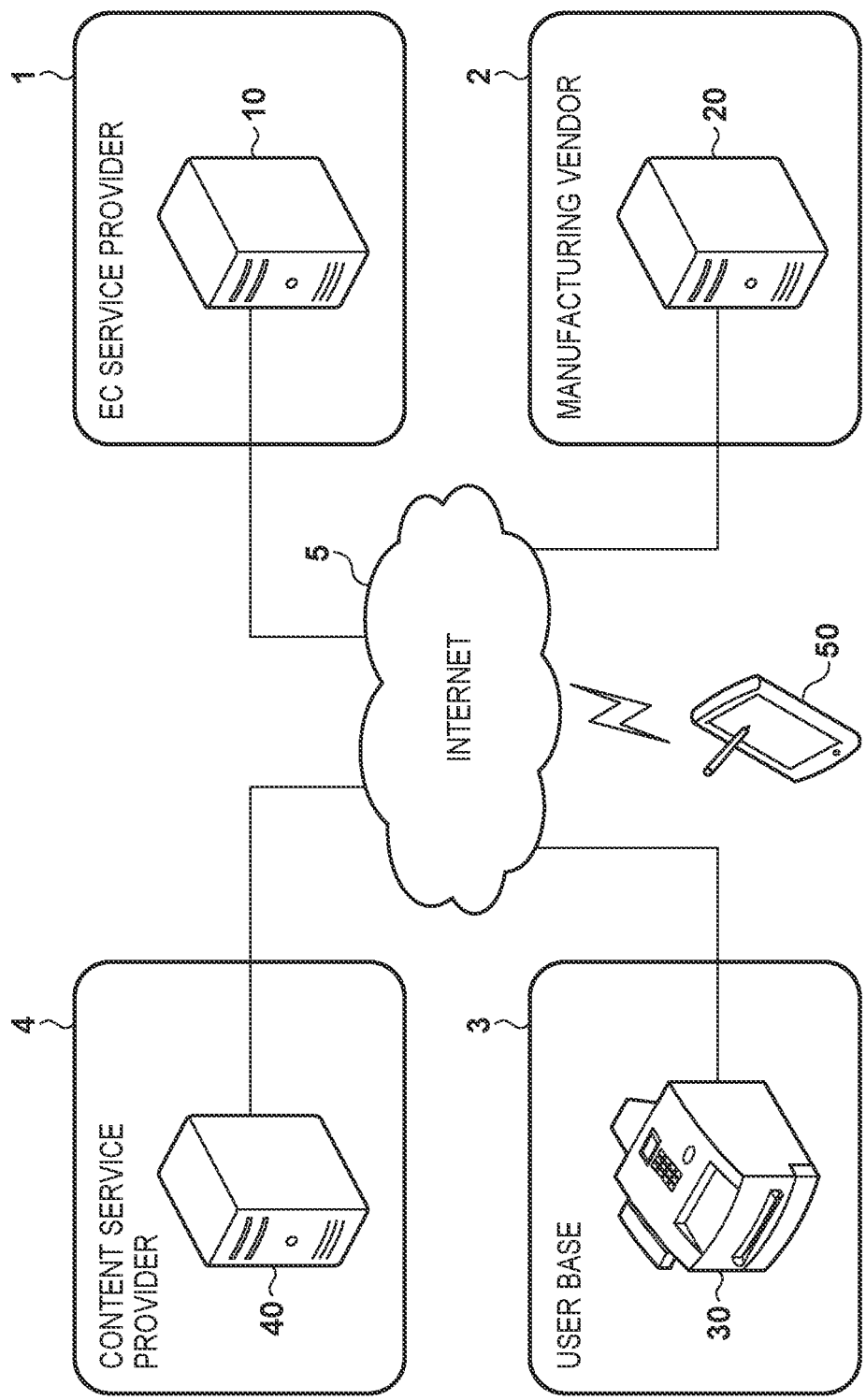
FIG. 1 shows an example of a system configuration according to the invention of the present application.

First, a general overview of services according to the invention of the present application will be described. FIG. 1 is a conceptual diagram of a system according to the invention of the present application. The system according to the invention of the present application is composed mainly of four entities: an EC service provider 1 that provides an EC service; a manufacturing vendor 2 of an image forming apparatus 30, such as a printer; a content service provider 4 that provides a content service; and a user of the image forming apparatus 30 (a user base 3). It will be assumed that various apparatuses according to the invention of the present application are connected in such a manner that they can communicate with one another via the Internet 5, which is one form of an external network. In FIG. 1, the image forming apparatus 30 that can be used by the user is installed in the user base 3. Although the EC service is used as one example of a web service in the following description, no limitation is intended in this regard, and another service may be used as long as it registers user information when used. Furthermore, although only one user base with one image forming apparatus will be exemplarily described for the sake of convenience, no limitation is intended in this regard. For example, there may be a plurality of user bases, and a plurality of image forming apparatuses may be installed in every user base.

An EC server 10 according to the invention of the present application is provided by the EC service provider 1. The EC service provider 1 provides, via the Internet 5, a service for selling image forming apparatuses and consumables, such as inks, that can be used by image forming apparatuses, such as image forming apparatus 30.

A management server 20 according to the invention of the present application is provided by the manufacturing vendor 2 of the image forming apparatus 30, and collects and manages information of, for example, an operational status of the image forming apparatus 30. The image forming apparatus 30 sends information of itself to the management server 20 via the Internet 5, upon activation or on a regular basis. Using the information collected from the image forming apparatus 30, the management server 20 also determines a status of the image forming apparatus 30, predicts consumption of the consumables (predicts times to change the consumables), and so on. It will be assumed that the management server 20 can provide such information to the EC service provider 1. Using the information provided by the management server 20, the EC server 10 provides the user who owns the image forming apparatus 30 with, for example, information indicating that the aforementioned times to change the consumables are approaching, and information related to sales prices. Although the contents of such information are not limited to particular contents, it will be assumed that they aim for promotion for the EC service.

A content server 40 according to the invention of the present application is provided by the content service provider 4. It will be assumed that the content server 40 provides various contents to the user, and the user prints the contents using the image forming apparatus 30 installed in the user base 3. Furthermore, it will be assumed that the user can, for example, write information on a resultant printout, and then cause the image forming apparatus 30 to scan the printout with the written information and upload an image of the scanned printout to the content server 40. Alternatively, an image of the printout may be captured using, for example, a camera included in a mobile terminal 50, such as a smartphone, owned by the user, and the captured image of the printout may be uploaded to the content server 40. The content server 40 can operate in coordination with the EC service provider 1 to offer an image forming apparatus used to print the contents handled by the content server 40 to the user (marketing) and encourage the user to purchase the same. The purpose of this offer is to make the user purchase the image forming apparatus from the EC service provider 1 and use the purchased image forming apparatus, thereby improving the convenience of the content service.

Although the number of each type of server is one in FIG. 1, no limitation is intended in this regard, and each server may be constituted by a plurality of server apparatuses depending on its functions and the like. For example, the EC service provider 1 may have a server that provides the EC service and a server that handles coordination with the management server 20 as separate servers.

The invention of the present application is based on the premise that, in order to use the EC service, the user needs to register user information with the EC service provider 1. Furthermore, in order to use the EC service with use of the user's image forming apparatus, the user needs to register the user's image forming apparatus with the EC service provider 1. The flow of registration of the user information and image forming apparatus will be described later using FIG. 5.

The user also needs to register the image forming apparatus with the management server 20 provided by the manufacturing vendor 2, which is a manufacturer of the image forming apparatus, separately from registration with the EC service. This registration enables the management server 20 to collect and manage information related to the image forming apparatus. This registration may also enable the user to receive various supports from the manufacturing vendor.

[Overview of Services]

Figure 2:
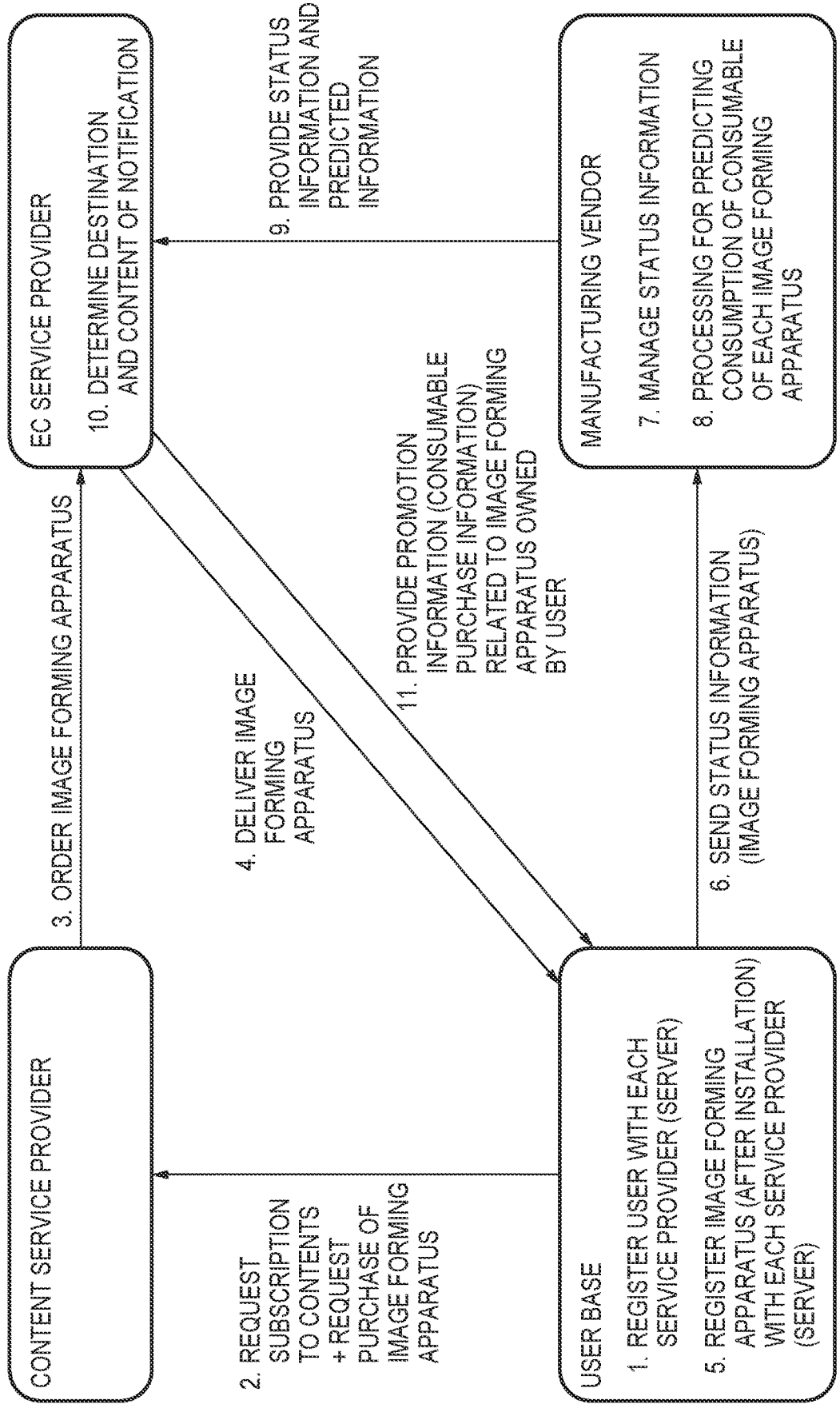
FIG. 2 is a diagram for describing a general overview of services according to the invention of the present application.

The following describes a general overview of services in the whole system according to the invention of the present application using FIG. 2.

First, the user registers user information with each service provider (server) that provides a service to be used by the user. Specifically, the user registers the user information with the EC server 10 provided by the EC service provider 1, and with the content server 40 provided by the content service provider 4.

Next, the user issues, to the content service provider 4, a request for a subscription to contents. It will be assumed that these contents are contents (e.g., image data) to be printed by an image forming apparatus, and examples thereof include a cram school brochure containing questions, various forms, etc. At this time, if the user does not own any image forming apparatus, the content service provider 4 offers a purchase of an image forming apparatus to the user.

Upon acceptance of a request for a purchase of the image forming apparatus together with the request for the subscription to the contents, the content service provider 4 places an order for the image forming apparatus with the EC service provider 1 with which it operates in coordination.

The EC service provider 1 delivers the image forming apparatus that has been ordered via the content service provider 4 to an order source, i.e., the user.

The user registers the image forming apparatus delivered from the EC service, or an image forming apparatus he/she has owned, with the management server 20 provided by the manufacturing vendor of the image forming apparatus. The user also registers information of the image forming apparatus with each service provider. In this way, the user can use the registered image forming apparatus in coordination with the services provided by the service providers.

Once the image forming apparatus has been registered with the management server 20, it sends its status information to the management server 20 at a preset timing (e.g., on a regular basis).

The management server 20 obtains the status information from the image forming apparatus, and manages the same.

Using the obtained status information, the management server 20 predicts consumption of consumables included in the image forming apparatus.

The management server 20 provides the status information and a prediction result to the EC service provider 1.

On the basis of the information provided by the management server, the EC service provider 1 notifies the user who owns the image forming apparatus of information related to the image forming apparatus. Specifically, the user is notified of such information as a notification of times to change the consumables, a guide showing goods that can replace the consumables, and a site where the goods can be purchased.

[System Configuration]

(Hardware Configurations)

Figure 3:
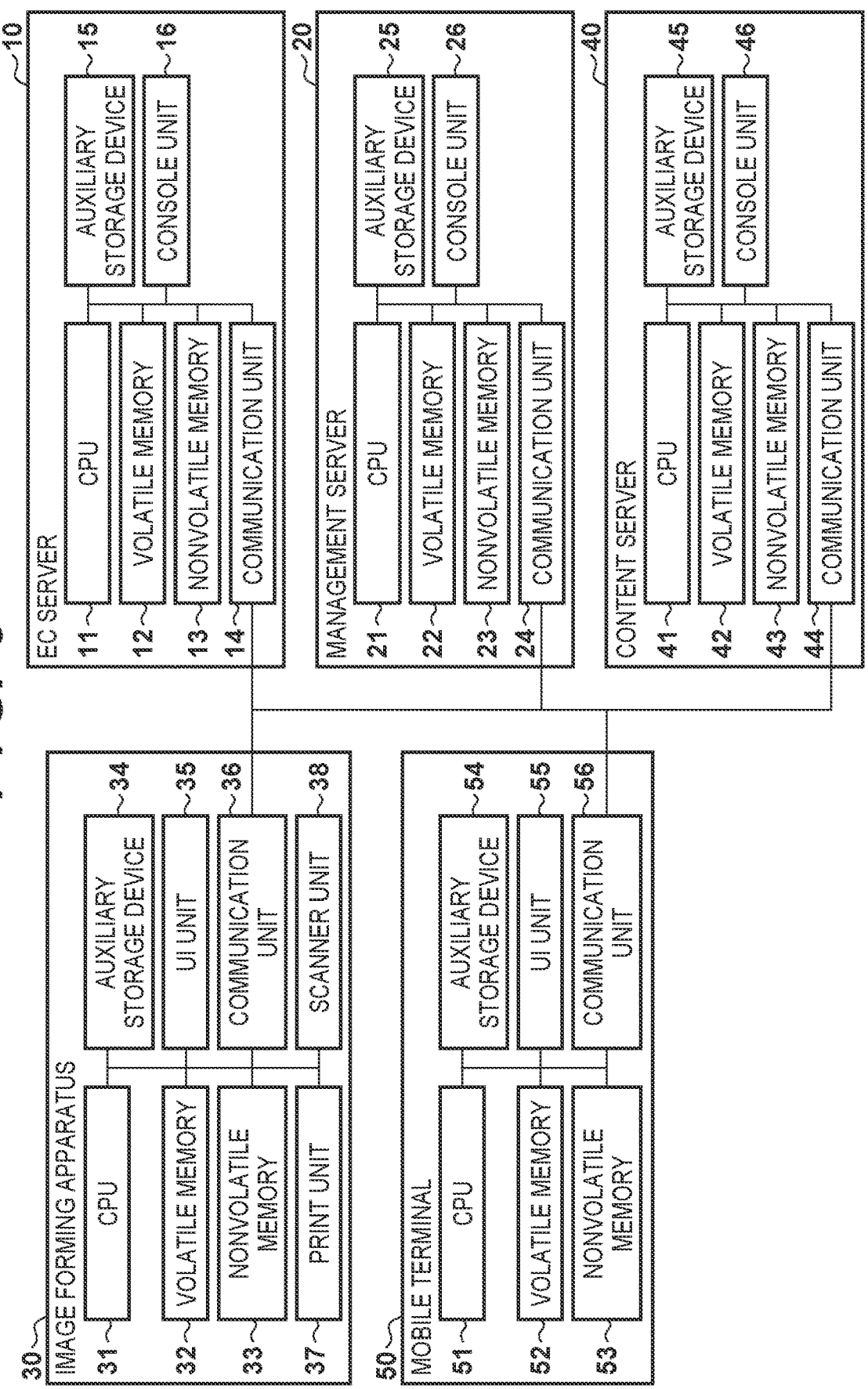
FIG. 3 shows examples of hardware configurations of apparatuses according to the invention of the present application.

FIG. 3 shows examples of hardware configurations of the apparatuses included in the system according to the present embodiment. The system according to the invention of the present application includes the image forming apparatus 30, the mobile terminal 50, the content server 40, the EC server 10, and the management server 20.

The image forming apparatus 30 is composed of a CPU 31, a volatile memory 32, a nonvolatile memory 33, an auxiliary storage device 34, a UI unit 35, a communication unit 36, a print unit 37, and a scanner unit 38. The CPU 31 is a control unit for controlling the overall operations of the image forming apparatus 30. The CPU 31 also implements various types of processing, which will be described later, by reading out and executing programs according to the invention of the present application. The volatile memory 32 is constituted by, for example, a random-access memory (RAM), and stores programs and data for executing various types of processing. The nonvolatile memory 33 is constituted by, for example, a read-only memory (ROM), and stores, for example, firmware and a fundamental program (an operating system or OS) of the image forming apparatus 30. The auxiliary storage device 34 is a nonvolatile storage device that stores various types of data. The UI unit 35 is an interface unit that enables interactions with the user, and functions as, for example, an input unit for accepting a user operation and a display unit for displaying a processing result and the like. The communication unit 36 is an interface unit for establishing connection between the image forming apparatus 30 and an external apparatus; herein, it communicates with various servers via the network. The print unit 37 performs various print operations in accordance with a print job. The scanner unit 38 reads in a document in accordance with a user operation. Image data of the document that has been read in is processed by various programs executed by the CPU 31.

The mobile terminal 50 is composed of a CPU 51, a volatile memory 52, a nonvolatile memory 53, an auxiliary storage device 54, a UI unit 55, and a communication unit 56. The CPU 51 is a control unit for controlling the overall operations of the mobile terminal 50. The CPU 51 also implements various types of processing, which will be described later, by reading out and executing programs according to the invention of the present application. The volatile memory 52 is constituted by, for example, a RAM, and stores programs and data for executing various types of processing. The nonvolatile memory 53 is constituted by, for example, a ROM, and stores a fundamental program (OS) and the like. The auxiliary storage device 54 is a nonvolatile storage device that stores various types of data. The UI unit 55 is an interface unit that enables interactions with the user, and functions as, for example, an input unit for accepting a user operation and a display unit for displaying a processing result and the like. The communication unit 56 is an interface unit for establishing connection between the mobile terminal 50 and an external apparatus; herein, it communicates with various servers via the network.

It will be assumed that the EC server 10, the management server 20, and the content server 40 are information processing apparatuses, and have the same hardware configuration herein. Below, the EC server 10 will be described as an example. Note that different servers may have different hardware configurations. The EC server 10 is composed of a CPU 11, a volatile memory 12, a nonvolatile memory 13, a communication unit 14, an auxiliary storage device 15, and a console unit 16. The CPU 11 is a control unit for controlling the overall operations of the apparatus. The CPU 11 also implements various types of processing, which will be described later, by reading out and executing programs according to the invention of the present application. The volatile memory 12 is constituted by, for example, a RAM, and stores programs and data for executing various types of processing. The nonvolatile memory 13 is constituted by, for example, a ROM, and stores, for example, firmware and a fundamental program (OS) of the apparatus. The communication unit 14 is an interface unit for establishing connection between the apparatus and an external apparatus; herein, it communicates with various apparatuses via the network. The auxiliary storage device 15 is a nonvolatile storage device that stores various types of data. The console unit 16 is an interface unit that enables interactions with a user, and functions as, for example, an input unit for accepting a user operation and a display unit for displaying a processing result and the like. The management server 20 and the content server 40 have the same hardware configuration as the EC server and corresponding parts shown in FIG. 3 labeled 21-26 and 41-46, respectively.

(Software Configurations)

Figure 4:
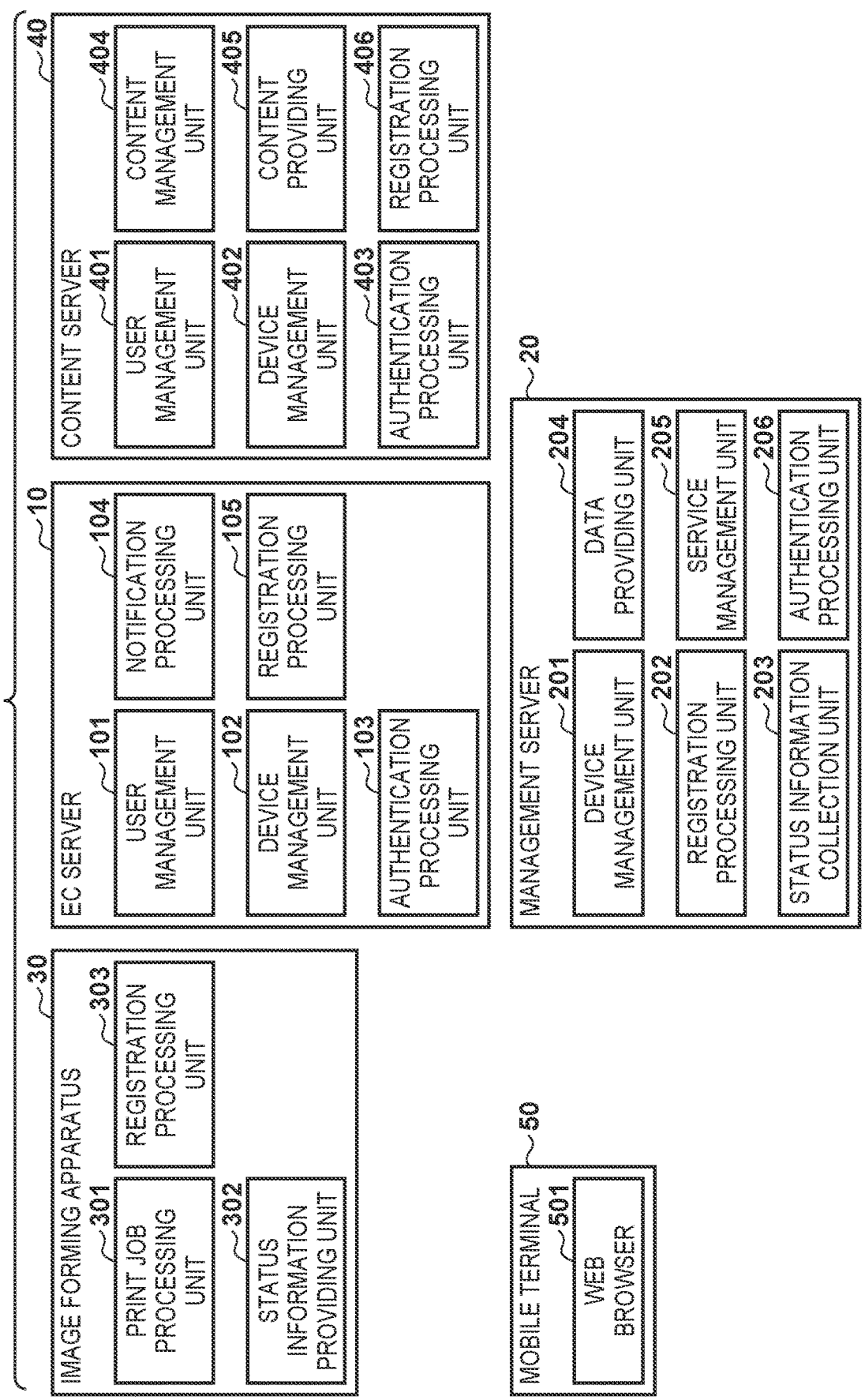
FIG. 4 shows examples of software configurations of the apparatuses according to the invention of the present application.

FIG. 4 shows examples of software configurations of the apparatuses included in the system according to the present embodiment. In the present embodiment, it will be assumed that items of software are executed as the CPUs of the apparatuses read out programs stored in storage units. Note that data structures (tables) of various types of information used in the present embodiment will be described later using FIGS. 12AA to 12DC.

The image forming apparatus 30 includes a print job processing unit 301, a status information providing unit 302, and a registration processing unit 303. The print job processing unit 301 receives a print job and executes print processing in accordance with the print job. Print jobs according to the present embodiment include a print job of a cloud print service provided by a cloud print (CP) server 1000 (described later), and a print job that has been generated in response to an instruction received directly from the mobile terminal 50 and the like. The status information providing unit 302 provides status information of the image forming apparatus to the management server 20 on a regular basis, at a predefined timing, or in response to a request from the management server 20. This status information may contain, for example, activation information, error information, history information, and the statuses of consumables (e.g., inks and paper). A structure of the status information will be described later using FIG. 6. In accordance with a request from a user, the registration processing unit 303 issues a registration request for registering the image forming apparatus to the EC server 10. The registration processing unit 303 also executes processing related to device registration in response to an instruction that has been issued by the EC server 10 in relation to the registration request.

The image forming apparatus 30 further includes a web browser, and can use services by accessing various servers.

The mobile terminal 50 includes a web browser 501. The web browser 501 uses various functions of services provided by various servers by accessing service screens provided by the servers with use of the Hypertext Transfer Protocol (HTTP) or a similar protocol. Applications that enable the use of the services according to the present embodiment have such functions as management of user information, configuration of print settings, and management of images. For example, in order to use the EC service provided by the EC server 10, the mobile terminal 50 may separately install an application corresponding to an EC site of the EC service, and use the EC service via the installed application.

The content server 40 includes a user management unit 401, a device management unit 402, an authentication processing unit 403, a content management unit 404, a content providing unit 405, and a registration processing unit 406. The user management unit 401 manages information of a user of the contents provided by the content server 40. The device management unit 402 manages information of a device (image forming apparatus) used to print the contents. Herein, the device management unit 402 manages an image forming apparatus and a user in association with each other. The associated user is, for example, an owner of the image forming apparatus. The authentication processing unit 403 executes authentication processing with use of authentication information (e.g., a user ID and a password) when, for example, the content service is used. The content management unit 404 manages various contents provided by the content server 40. In response to a request from a user, the content providing unit 405 provides various contents managed by the content management unit 404. In response to a request from a user, the registration processing unit 406 executes processing for registering a user of the content service, an image forming apparatus for printing various contents, and various contents. The user, image forming apparatus, and content data thus registered are respectively managed by the user management unit 401, the device management unit 402, and the content management unit 404.

The EC server 10 includes a user management unit 101, a device management unit 102, an authentication processing unit 103, a notification processing unit 104, and a registration processing unit 105. The user management unit 101 manages information of a user of the EC service. The device management unit 102 manages information of a device (image forming apparatus) used in the EC service. Herein, the device management unit 102 manages an image forming apparatus and a user in association with each other. The associated user is, for example, an owner of the image forming apparatus. The authentication processing unit 103 executes authentication processing with use of authentication information (e.g., a user ID and a password) when, for example, the EC service is used. On the basis of status information obtained from the management server 20, the notification processing unit 104 issues various notifications to an owner of an image forming apparatus. The contents of these notifications will be described later. In response to a request from a user, the registration processing unit 105 executes processing for registering a user of the EC service and a device. The user and the device thus registered are respectively managed by the user management unit 101 and the device management unit 102.

The management server 20 includes a device management unit 201, a service management unit 205, a registration processing unit 202, a status information collection unit 203, a data providing unit 204, and an authentication processing unit 206. The device management unit 201 manages information of a device (image forming apparatus) to be managed. The service management unit 205 manages a service provider (server) to which collected information of a device is to be provided. In response to a request from a user, the registration processing unit 202 executes processing for registering a device. The device thus registered is managed by the device management unit 201. The registration processing unit 202 also executes processing for registering a service provider, such as the EC server 10. The service provider thus registered is managed by the service management unit 205. The status information collection unit 203 collects status information from an image forming apparatus to be managed. The management server 20 may request the status information on a regular basis or at a predefined timing, or the image forming apparatus 30 may send the status information on a regular basis or at a predefined timing. The status information thus collected is managed by the device management unit 201. The data providing unit 204 provides information of a device managed by the device management unit 201 to the EC server 10. This information is provided, for example, on a regular basis, upon request from the EC server 10, or when managed data is updated. The authentication processing unit 206 executes authentication processing with use of authentication information (e.g., a user ID and a password), for example, at the time of device registration or when registered content is changed. Furthermore, when the EC server 10 has requested information of a device, the authentication processing unit 206 executes authentication processing for determining whether the EC server 10 is a legitimate request source based on information managed by the service management unit 205.

[Structures of Tables]

The following describes tables managed by the apparatuses according to the invention of the present application using FIGS. 12AA to 12CC. Note that items contained in the following tables serve as examples, and no limitation is intended in this regard. For example, a plurality of tables may be structured as one table, or may be classified in more detail.

FIGS. 12AA to 12AC show structures of management tables held by the EC server 10. The EC server 10 holds a user management table, a device management table, and a product table.

The user management table shown in FIG. 12AA manages information related to users of the EC service, and contains user IDs, passwords, user names, e-mail addresses, physical addresses, payment information, and device IDs. The user IDs are identification information for uniquely identifying the users of the EC service provided by the EC server 10, and issued by the EC server 10 at the time of user registration. The passwords are authentication information used in user authentication. The user names, e-mail addresses, physical addresses, and payment information are input as personal information of the users at the time of user registration. The device IDs are identification information for uniquely identifying devices (image forming apparatuses) associated with the users. It will be assumed that the users use these image forming apparatuses to perform various print operations, and can print, for example, contents provided by the content server 40. One or more image forming apparatuses can be associated with one user.

The device management table shown in FIG. 12AB manages information of devices used in the services according to the invention of the present application, and contains device IDs, registration IDs, serial numbers, and status information. The device IDs are identification information for uniquely identifying the registered devices, and issued by the EC server 10 at the time of device registration. The registration IDs are information used as one type of authentication information at the time of device registration; how the registration IDs are specifically used will be described later using FIG. 8. The serial numbers are assigned to the devices by a manufacturer of the devices. The status information is set based on information obtained from the management server 20, and stores information indicating, for example, the activation statuses of the image forming apparatuses and the degrees of consumption of consumables.

The product table shown in FIG. 12AC manages products that can be sold by the EC server 10, and contains product IDs, product types, serial numbers, and manufacturer information. The product IDs are identification information for uniquely identifying the products, and issued by a manufacturer. The product types indicate the types of the products (e.g., ink and paper). The serial numbers are assigned to the products by the manufacturer of the products. The manufacturer information is related to the manufacturer of the products.

FIGS. 12BA to 12BE show structures of management tables held by the management server 20. The management server 20 holds a device management table, a service management table, a model management table, a consumable management table, and a use history table.

The device management table shown in FIG. 12BA manages devices from which the management server 20 collects status information, and contains device IDs, serial numbers, model IDs, the status information, and provision destination information. The device IDs are identification information that enables the management server 20 to uniquely manage the devices. It will be assumed that these device IDs are different from the device IDs managed by the EC server 10. The serial numbers are assigned to the devices by a manufacturer of the devices (that is to say, the manufacturing vendor 2 that provides the management server 20). The model IDs are identification information for uniquely identifying the model types (product models) of the image forming apparatuses, and assigned by the manufacturing vendor 2. The status information managed in this device management table is the status information collected from the image forming apparatuses. Collected data may be stored as-is, or in an edited form where necessary, as the status information. The provision destination information indicates provision destinations to which the status information of the devices and the like are provided; herein, the provision destination information indicates service IDs of various servers.

The service management table shown in FIG. 12BB manages services serving as provision destinations to which, for example, various types of information collected from the image forming apparatuses are provided, and contains service IDs, authentication information, and send destination information. Examples of these provision destinations include the EC server 10. The service IDs are identification information for uniquely identifying the provision destinations, and issued by the management server 20 at the time of service registration. It will be assumed that service servers (e.g., the EC server 10) are notified of the service IDs issued by the management server 20, and thus acknowledge their own service IDs. For example, upon acceptance a request for the status information from the services, the authentication information is used to determine whether the services are legitimate request sources. The send destination information indicates destination information, that is to say, provision destinations to which various types of information of the devices are provided; examples of the send destination information include Uniform Resource Locators (URL) and IP addresses.

The model management table shown in FIG. 12BC manages the model types of the image forming apparatuses, and contains model IDs and corresponding consumables. The model IDs are identification information for uniquely identifying the model types of the image forming apparatuses, and assigned by the manufacturing vendor 2. These model IDs correspond to the model IDs in the device management table (FIG. 12BA). The corresponding consumables are information indicating consumables (e.g., inks) compatible with the image forming apparatuses; this information is assigned by a manufacturing vendor of the consumables as consumable IDs. An image forming apparatus and consumables corresponding thereto typically belong to the same manufacturing vendor.

The consumable management table shown in FIG. 12BD manages consumables used by the image forming apparatuses, and contains consumable IDs, consumable types, sizes, and manufacturer information. The consumable IDs are identification information for uniquely identifying the consumables (products), and assigned by a manufacturing vendor of the consumables. These consumable IDs correspond to the corresponding consumables in the model management table. The consumable types indicate the types, such as ink and paper. The sizes corresponding to inks, for example, store the maximum volumes at the time of product shipment. The manufacturer information is related to the manufacturer of the products.

The use history table shown in FIG. 12BE manages information of use histories in the image forming apparatuses to be managed, and contains device IDs, details of use, dates of use, and users. The device IDs indicate image forming apparatuses that have been used, and correspond to the device IDs in the device management table (FIG. 12BA). The details of use indicate the details of use by the image forming apparatuses, and information of consumables that have been used (e.g., the number of sheets of paper, and the amount of ink used per color). The dates of use indicate dates/times of execution of processing. The users indicate users who requested the processing.

FIGS. 12CA to 12CC show structures of management tables held by the content server 40. The content server 40 holds a user management table, a content management table, and a content use history table.

The user management table shown in FIG. 12CA manages information related to users of the content service provided by the content server 40, and contains user IDs, passwords, user names, e-mail addresses, physical addresses, and payment information. The user IDs are identification information for uniquely identifying the users of the content service provided by the content server 40, and are issued by the content server 40 at the time of user registration. Note that these user IDs are different from the user IDs managed in the user management table (FIG. 12AA) in the EC server 10.

The passwords are authentication information used in user authentication. The user names, e-mail addresses, physical addresses, and payment information are input as personal information of the users at the time of user registration.

The content management table shown in FIG. 12CB manages content data provided by the content service, and contains content IDs, allowed users, content information, creators, dates/times of creation, and expiration dates for use. The content IDs are identification information for uniquely identifying the content data, and are issued by the content server 40. The allowed users indicate users who are allowed to use the corresponding content among all users of the content service, and these allowed users correspond to the user IDs managed in the user management table (FIG. 12CA). It will be assumed that, for example, contracts between the users and the content service provider 4 determine which user is allowed to use which content data. The content information indicates storage locations of actual data of contents. The creators indicate creators of the content data. The dates/times of creation indicate dates/times of creation of the content data, and may indicate dates/times of update if the data has been updated. The expiration dates for use indicate dates until when the content data is usable.

The content use history table shown in FIG. 12CC indicates the history of use of the content data, and contains content IDs, users, and dates/times of use. The content IDs indicate content data that has been used, and correspond to the content IDs in the content management table (FIG. 12CB). The users indicate users who have used contents, and correspond to the user IDs in the user management table (FIG. 12CA). The dates/times of use indicate dates/times of use of contents.

[Registration of Information of User and Device]

As described above, the system according to the present embodiment is composed of the image forming apparatus 30, such as a printer, the mobile terminal 50 on which a user performs various operations, and various servers that provide services.

A description is now given of the premise of the use of the services according to the invention of the present application, that is to say, registration of information of a user and a device (image forming apparatus).

(Registration with EC Service)

Figure 5:
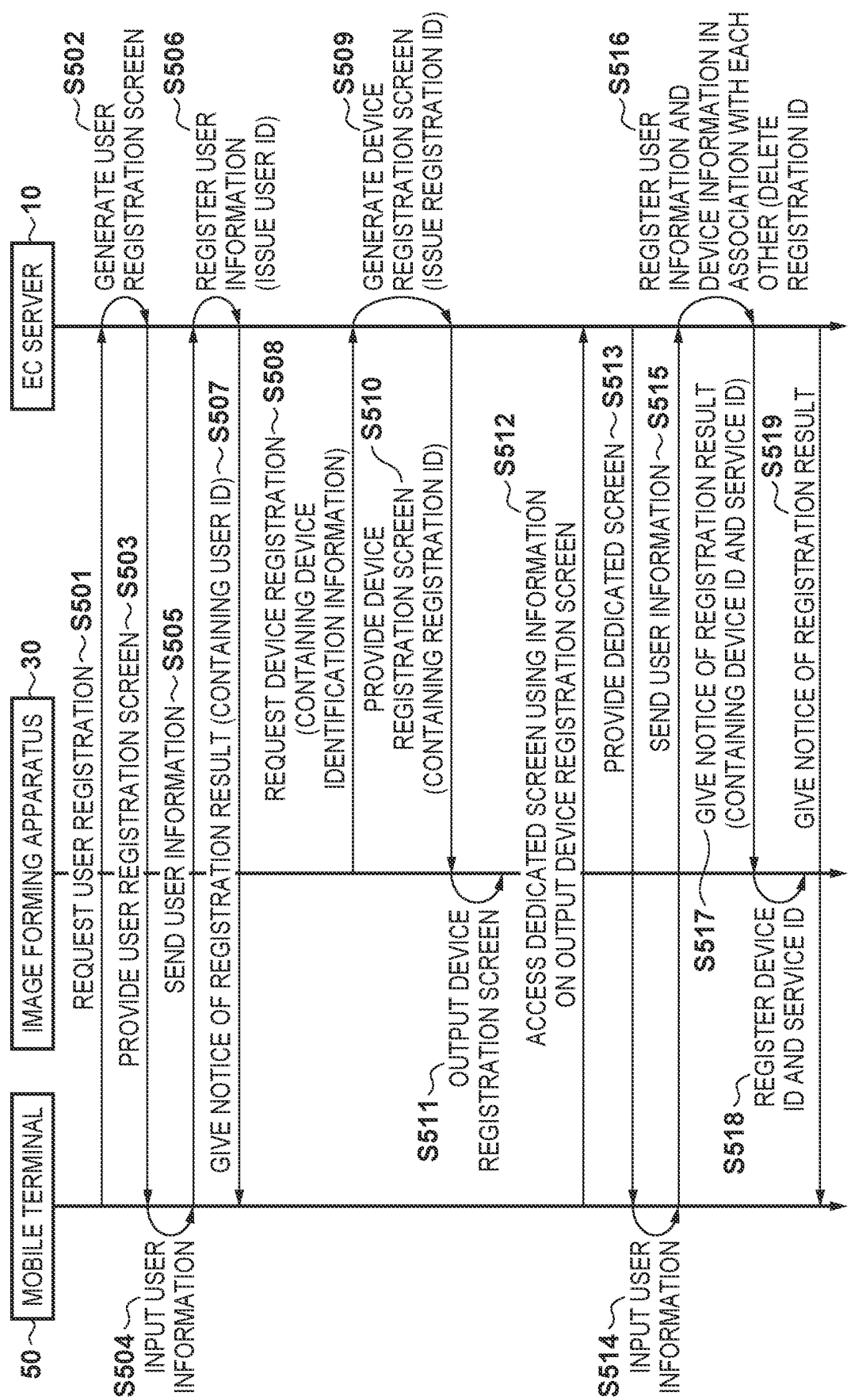
FIG. 5 shows a sequence for registering various types of information with an EC service according to the invention of the present application.

FIG. 5 shows a sequence for registering various types of information with the EC server 10. Below, steps (1) and (5) that have been described using FIG. 2 will be elaborated. Specifically, steps S501 to S507 are related to processing for registering user information, whereas steps S508 to S519 are related to processing for registering device information. Although the mobile terminal 50 is used in registration processing described in the present embodiment, it goes without saying that a PC and the like may be used instead.

In step S501, the mobile terminal 50 requests the EC server 10 to register user information in response to an instruction input by a user via the web browser 501.

In step S502, the EC server 10 generates a user registration screen.

In step S503, the EC server 10 provides the generated user registration screen to the mobile terminal 50.

In step S504, the mobile terminal 50 displays the user registration screen provided by the EC server 10, and accepts input of user information by the user via this screen. Examples of the input user information include an e-mail address, which is contact information of the user, and a password (authentication information) used in user authentication. Other examples of the user information include a user name, a physical address of the user to which goods are shipped from the EC service provider 1, and payment information (e.g., card information necessary for payment).

In step S505, the mobile terminal 50 sends the user information input by the user to the EC server 10.

In step S506, the EC server 10 executes processing for registering the user information accepted from the mobile terminal 50. At this time, the EC server 10 issues a user ID for uniquely identifying the user. Note that the user may be allowed to set an arbitrary value as the user ID. Furthermore, an initial value of the password input in step S504 may be set by the EC server 10. Note that the processing of step S506 registers the user information with the user management table in FIG. 12AA.

In step S507, the EC server 10 gives notice of a registration result. At this time, the EC server 10 also notifies the user of the issued user ID.

Next, the user registers information of an image forming apparatus to be used in the EC service provided by the EC server 10 (device registration). Note that the purpose of the device registration is to enable the use of services of the EC service provider 1 (e.g., later-described cloud printing and storing data to the server) from the image forming apparatus 30.

In step S508, the image forming apparatus 30 requests the EC server 10 for device registration in response to an instruction input by the user via the UI unit 35. Specifically, the image forming apparatus 30 sends a registration request containing its own identification information (e.g., a serial number issued by a manufacturing vendor).

In step S509, the EC server 10 generates a device registration screen. At this time, the EC server 10 issues an ID (registration ID) for registering the image forming apparatus that sent the device registration request, and a device ID. Note that this registration ID and this device ID are associated with the serial number of the image forming apparatus 30, which was sent in step S508. For example, the EC server 10 receives a device registration request from an image forming apparatus with a serial number "MFPxxxx01." Provided that the EC server 10 issues "xT1" and "ECD0001" as a registration ID and a device ID, respectively, the serial number "MFPxxxx01," the device ID "ECD0001," and the registration ID "xT1" are managed in association with one another.

The device registration screen displays access information for accessing a screen for inputting user information. This access information may be displayed on the screen as, for example, a QR Code®, or may indicate a URL using a character string that can be recognized by the user. That is to say, the access information displayed on the generated device registration screen is information for accessing a screen dedicated to the image forming apparatus that sent the device registration request, and contains the registration ID.

In step S510, the EC server 10 provides the generated device registration screen to the image forming apparatus 30.

In step S511, the image forming apparatus 30 outputs the provided device registration screen. This output may be realized by displaying the device registration screen on the UI unit 35 of the image forming apparatus 30, or by printing the device registration screen.

In step S512, via the web browser 501 of the mobile terminal 50, the user accesses the screen for inputting the user information using the access information displayed on the output device registration screen. For example, when the QR Code® is displayed on the device registration screen, the user causes the camera of the mobile terminal 50 to recognize the QR Code®. This causes the web browser 501 of the mobile terminal 50 to access the screen for inputting the user information. On the other hand, when the URL is displayed on the device registration screen, the user accesses the screen for inputting the user information by inputting the URL to the web browser 501 of the mobile terminal 50. As described above, the QR code or URL contains the registration ID. For example, when the image forming apparatus with the serial number "MFPxxxx01" has executed step S512, the output QR code or URL contains the registration ID "xT1."

In step S513, the EC server 10 provides an input screen in response to the access made in step S512.

In step S514, the user inputs his/her user information on the input screen provided by the EC server 10. The information input here is the user information (user ID and password) that has already been registered with the EC server 10.

In step S515, the mobile terminal 50 sends the user information input by the user (the user ID and password that have been registered with the EC server 10) to the EC server 10.

In step S516, with use of the registration ID contained in the URL, the EC server 10 identifies which image forming apparatus is targeted for registration processing. The EC server 10 also authenticates a match between the user information input by the mobile terminal 50 and the user information that has already been managed. If the authentication succeeds, the EC server 10 registers the device ID of the image forming apparatus that is currently targeted for registration in association with the successfully authenticated user (the user information that has already been managed). For example, when the URL used in the access made in step S512 contains "xT1," the EC server 10 identifies "ECD0001" and "MFPxxxx01" as the device ID and the serial number of the image forming apparatus targeted for registration, respectively. Furthermore, provided that the user ID and the password sent in step S515 are "ECU0001" and "XXXXX00001," respectively, the EC server 10 manages the device ID "ECD0001" and the user ID "ECU0001" in association with each other. Upon completion of registration, the EC server 10 deletes the registration ID issued in step S509 from the table. That is to say, the user ID and the device ID are associated with each other in step S516.

In step S517, the EC server 10 notifies the image forming apparatus 30 of a result of device registration. At this time, the EC server 10 also notifies the image forming apparatus 30 of identification information indicating the EC service provider 1 to which the EC server 10 belongs (e.g., a service ID issued by the management server 20) and the device ID indicating the image forming apparatus, which was issued in step S509. The user ID used in authentication may also be sent.

In step S518, the image forming apparatus 30 records the service ID and the device ID received from the EC server 10 to the auxiliary storage device 34 and the like.

In step S519, the EC server 10 notifies the user (mobile terminal 50) of the result of device registration. This concludes the sequence.

(Registration with Content Server)

Figure 9:
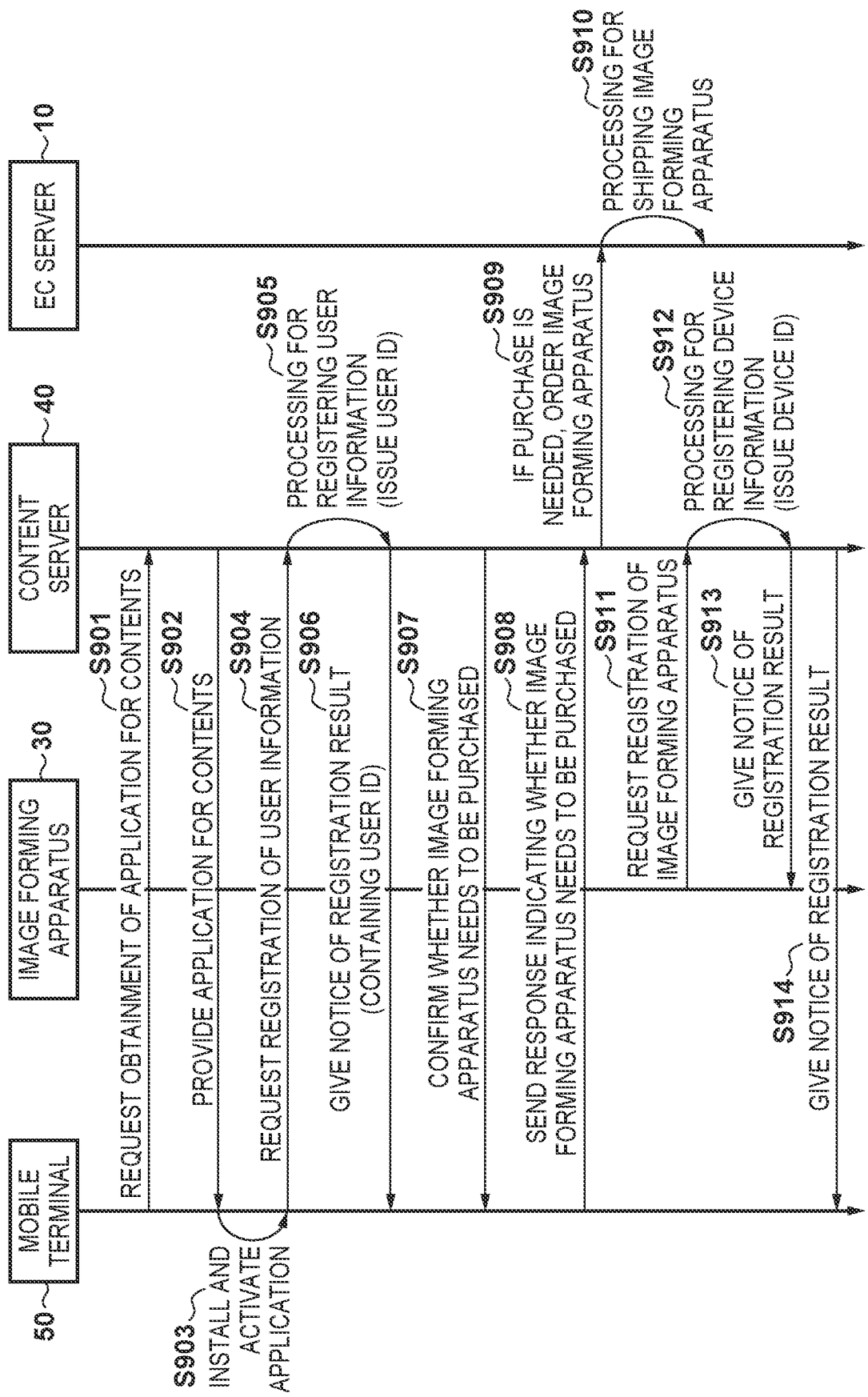
FIG. 9 shows a sequence for registering various types of information with a content server according to the invention of the present application.

FIG. 9 shows a sequence for registering various types of information with the content server 40. Below, steps (1) to (5) that have been described using FIG. 2 will be elaborated.

In step S901, in order to use the content service, a user requests the content server 40 for obtainment (downloading) of an application via the mobile terminal 50.

In step S902, the content server 40 provides the application in response to the request from the user.

In step S903, the mobile terminal 50 installs and activates the provided application.

In step S904, the mobile terminal 50 inputs various types of user information to a screen that is provided by the activated application for registering user information (e.g., a name, contact information, a physical address, and payment information), and sends a registration request to the content server 40.

In step S905, the content server 40 executes processing for registering the user information received from the mobile terminal 50. For example, the content server 40 issues an account (e.g., a user ID) to the user.

In step S906, the content server 40 notifies the user (mobile terminal 50) of a registration result. This notification contains the issued user ID and the like.

In step S907, the content server 40 seeks confirmation of a purchase of an image forming apparatus that can be used in the content service. This image forming apparatus has, for example, a function of downloading content data from the content server 40 via the network and printing the content data. Alternatively, a set including the image forming apparatus and a plan for using the content service may be purchasable.

In step S908, the user designates whether the image forming apparatus needs to be purchased via the mobile terminal 50.

If the user designates the purchase of the image forming apparatus, the content server 40 places an order for the image forming apparatus with the EC service provided by the EC server 10 in step S909. At this time, it is preferable that the user registration processing from step S501 to step S507 shown in FIG. 5 be completed before step S909. If the user registration processing from step S501 to step S507 is completed, the user information registered in steps S501 to S507 is input to a login screen for the EC service, and the use of the EC service is started. If the user registration processing from step S501 to step S507 is not completed before step S909, steps S501 to S507 of FIG. 5 may be executed in harmony with step S909.

In step S910, the EC server 10 executes processing for shipping the image forming apparatus to an end user in response to the order from the content server 40. At this timing, the user has already logged into the EC service, and thus the physical address of the user is identified from login information, and the image forming apparatus is shipped to the identified physical address.

In step S911, the user requests the content server 40 for registration of the image forming apparatus from the image forming apparatus delivered from the EC service, or from an already-owned image forming apparatus compatible with the content service.

In step S912, the content server 40 executes processing for registering device information in response to the request from the image forming apparatus.

In step S913, the content server 40 notifies the image forming apparatus of a result of the registration processing.

In step S914, the content server 40 notifies the user (mobile terminal 50) of the result of the registration processing. Note that the flow of processing from step S911 to step S914 may be the same as the flow of processing from step S508 to step 517 shown in FIG. 5 concerning registration with the EC server 10. This concludes the sequence for registering information with the content server 40.

[Management of Image Forming Apparatus]

Figure 6:
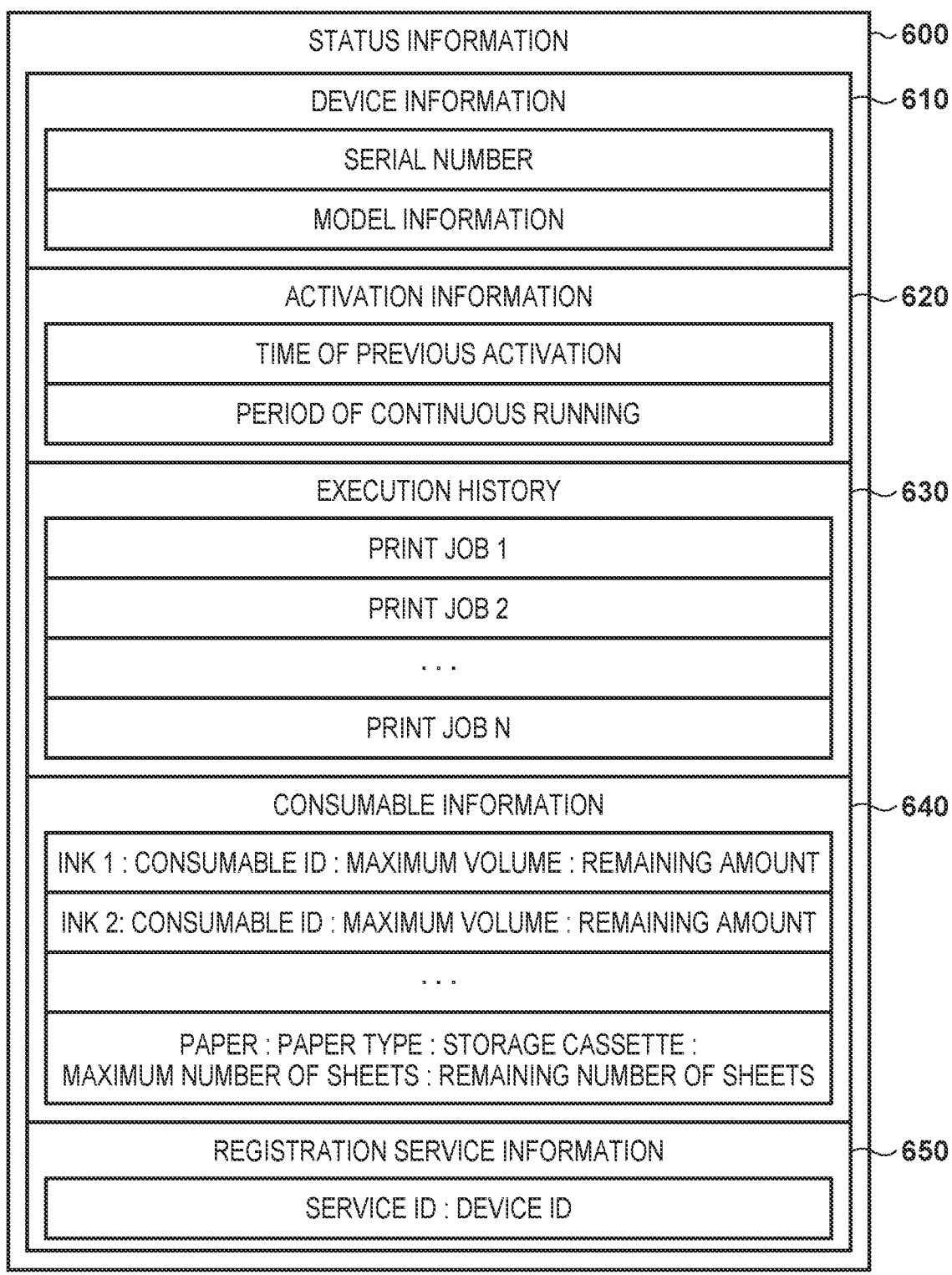
FIG. 6 shows a structure of status information according to the invention of the present application.

FIG. 6 shows a structure of status information that is sent from the image forming apparatus 30 to the management server 20. Note that information described below serves as an example; other information may be contained, and the information described below may not necessarily be contained if it can be obtained from other information. Furthermore, sent contents may consist of the differences from contents that were previously sent, or the entirety of contents related to a certain period may be sent. Moreover, collected information may vary depending on the function and model of the image forming apparatus.

Status information 600 according to the present embodiment is composed of device information 610, activation information 620, an execution history 630, consumable information 640, and registration service information 650.

The device information 610 contains apparatus-related information of the image forming apparatus that sends the status information 600. For example, it contains a serial number and model information. It may also contain an apparatus configuration and the like.

The activation information 620 contains information indicating the time of previous activation of the image forming apparatus 30 and a period in which the image forming apparatus 30 is running continuously.

The execution history 630 contains information of a history of print jobs executed by the image forming apparatus 30. The contained information may indicate not only print jobs that actually led to print operations, but also a printout that failed halfway, a cancelled print job, and the like. The contained information may also indicate, for example, the amounts of inks and the numbers of sheets of paper that were consumed in print jobs.

The consumable information 640 is related to consumables included in the image forming apparatus 30 at the timing when the status information is sent. For example, when the image forming apparatus 30 includes three ink cassettes and one paper cassette, the consumable information 640 contains information of the current statuses of these cassettes. With respect to inks, the contained information indicates product information (consumable IDs) of the inks, the maximum volumes of the inks, the remaining amounts of the inks, etc. With respect to paper, the contained information indicates a paper type, a cassette in which the paper is stored, the maximum number of sheets of paper that can be stored, the remaining number of sheets of paper, etc.

The registration service information 650 contains information related to a service with which the image forming apparatus 30 has been registered (e.g., the EC service). The contained information indicates a service ID for uniquely specifying the service, a device ID that has been assigned by the service to the image forming apparatus, etc. That is to say, the registration service information 650 contains information that is provided by the EC server 10 in the aforementioned step S517 of FIG. 5.

The management server 20 collects the foregoing status information 600 from the image forming apparatus 30, and manages the same.

[Notification Processing]

Notification processing of the EC server 10 according to the present embodiment will now be described in detail. The present embodiment introduces an example in which the EC server 10 notifies the user of the image forming apparatus 30 of various types of information based on status information of the image forming apparatus held in the management server 20.

In this example, the management server 20 predicts the degrees of consumption of consumables in the registered image forming apparatus and provides predicted information to the EC server 10, and the EC server 10 notifies the user of the predicted information. For example, when the consumables are inks, the user may be notified of purchase timings and where to purchase the inks by e-mail. Note that it is preferable to execute processing of FIG. 7 after those of FIGS. 5 and 9.

(Processing Sequence)

Figure 7:
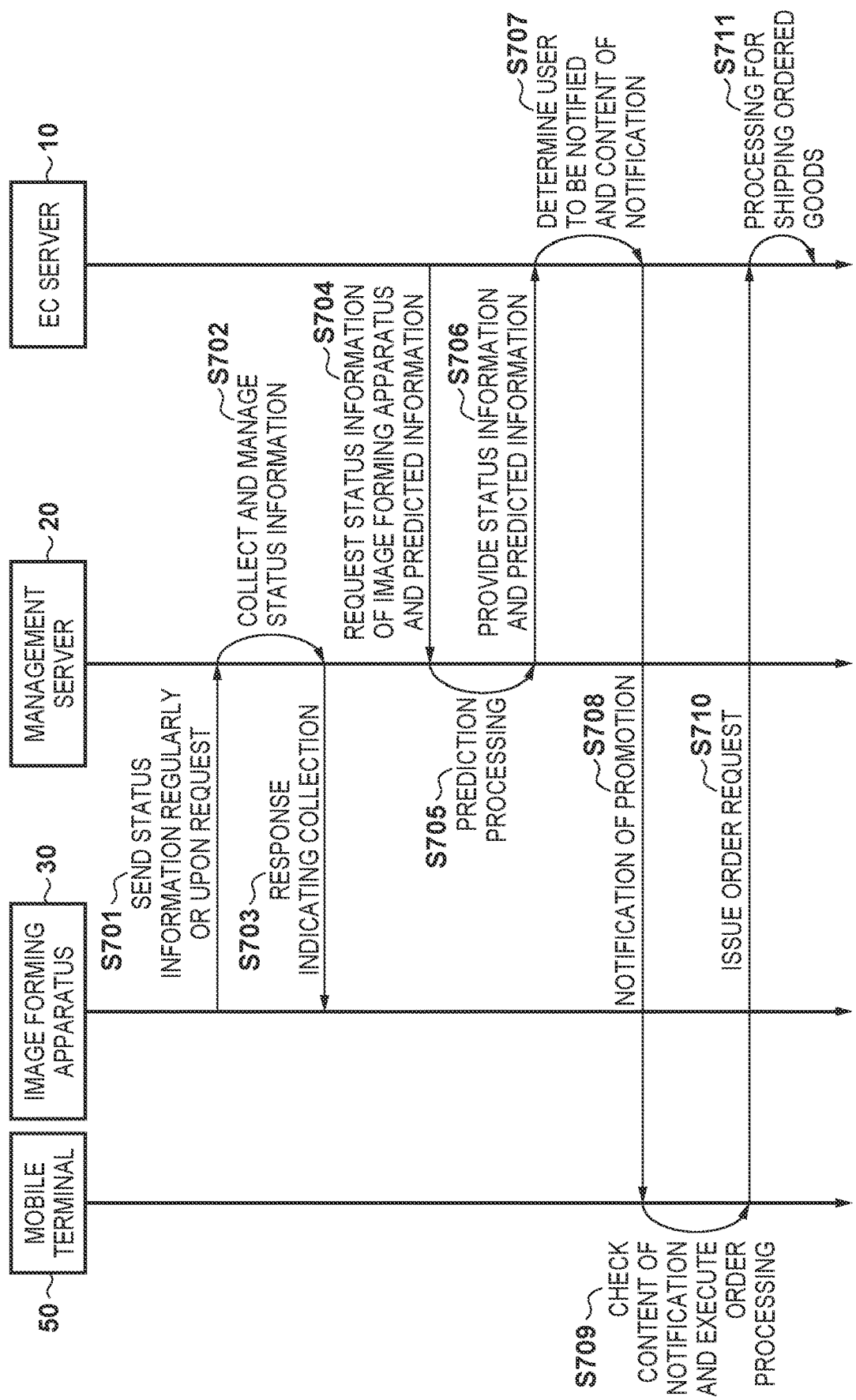
FIG. 7 shows a service sequence according to the invention of the present application.

The following describes a sequence of the notification processing according to the present embodiment using FIG. 7.

In step S701, the image forming apparatus 30 sends its own status information to the management server 20 on a regular basis, at a preset timing, or upon request from the management server 20.

In step S702, the management server 20 receives the status information from the image forming apparatus 30, and manages the same.

In step S703, upon receiving the status information, the management server 20 sends a response indicating that the status information has been collected to the image forming apparatus 30. If there is no response from the management server 20 within a predetermined interval since the status information was sent, the image forming apparatus 30 may re-send the status information. If the management server 20 cannot receive the status information from the image forming apparatus 30 even though it sent a request for the status information, the request may be sent repeatedly several times, and the image forming apparatus may be deemed out of operation if the status information cannot be received nonetheless.

In step S704, the EC server 10 requests the management server 20 for the status information of the image forming apparatus to be processed by the EC server 10, for example, on a regular basis or at a preset timing. Herein, the EC server 10 takes the initiative in requesting the management server 20 for the status information; alternatively, the management server 20 may take the initiative in sending the status information to the EC server 10.

In step S705, in response to the request from the EC server 10, the management server 20 executes processing related to prediction of consumption of consumables of the image forming apparatus 30 with use of the collected status information of the image forming apparatus 30 (hereinafter, prediction processing). Note that the prediction processing is not limited to being executed at the timing of acceptance of this request, and may be executed, for example, on a regular basis. Furthermore, the prediction processing need not necessarily be executed by the management server 20; the status information may be sent to the EC server 10, and the EC server 10 may execute the prediction processing with use of the status information. In step S705, the prediction processing is executed using status information of an image forming apparatus registered with the EC server 10. For example, when the image forming apparatus 30 is registered with the EC server 10, a prediction result obtained using the status information of the image forming apparatus 30 is sent to the EC server 10. On the other hand, when the image forming apparatus 30 is registered with an EC service provider that is different from the EC service provider of the EC server 10, a prediction result obtained using the status information of the image forming apparatus 30 is not sent to the EC server 10. Note that the specifics of the prediction processing will be described later using FIG. 8.

In step S706, the management server 20 sends the status information of the image forming apparatus 30 and a result of the prediction processing to the EC server 10. Note that the management server 20 may obtain, in advance, information of the image forming apparatus 30 managed by the EC server 10, and send the status information of the image forming apparatus 30 and the result of the prediction processing either when the status information is updated or on a regular basis.

In step S707, the EC server 10 determines the image forming apparatus to which a notification is to be sent and the content of the notification based on the status information and the result of the prediction processing obtained from the management server 20. This notification indicates, for example, low remaining amounts of inks used as consumables, purchase timings, a sales page or campaign for consumables provided by the EC service, and introduction of prices and the like. The EC server 10 also identifies, from user information managed by itself, an owner of the image forming apparatus to which the notification is to be sent, and obtains information of that notification destination. Examples of this information of the notification destination include an e-mail address of a user. Specifically, the status information sent from the management server 20 to the EC server 10 in step S706 contains a device ID. Meanwhile, the EC server 10 manages user IDs in association with device IDs as described using FIG. 12AA and step S516. Accordingly, the EC server 10 identifies a user ID associated with the device ID sent in step S706, and uses an e-mail address corresponding to the identified user ID in the later-described step S708.

A notification of promotion may be issued using other methods. Specifically, when a user has logged into the EC service provider 1 via the UI of the image forming apparatus 30, the EC server 10 sends a user ID (e.g., ECU0001) of that user to the image forming apparatus 30. Then, the image forming apparatus 30 sends the user ID (e.g., ECU0001) and a serial number of the image forming apparatus 30 (e.g., MFPxxxx01) to the management server 20. Accordingly, the management server 20 manages the user ID (e.g., ECU0001) and the serial number of the image forming apparatus 30 (e.g., MFPxxxx01) in association with each other. Then, the image forming apparatus 30 sends status information (containing the serial number (e.g., MFPxxxx01)) to the management server 20 in step S701. Next, the management server 20 determines that the user ID (e.g., ECU0001) is associated with the serial number contained in the status information (e.g., MFPxxxx01), and identifies the EC service provider 1 based on the user ID. Thereafter, the management server 20 sends the result of the prediction processing in step S705 to the EC service provider 1.

In step S708, the EC server 10 issues a notification of promotion to the user who has been identified as the notification destination. This notification of promotion is issued using the e-mail address described in step S707. It will be assumed that this e-mail address can be referenced on the mobile terminal 50 owned by the user.

In step S709, the user checks, via the mobile terminal 50, the content of the notification e-mailed from the EC server 10. As the notification contains information indicating where to purchase consumables, the user can order consumables based on such information. For example, the user can order consumables by accessing a page for goods that has been indicated by the e-mailed notification via the web browser 501 of the mobile terminal 50.

In step S710, the mobile terminal 50 issues an order request to the EC server 10 in response to an order instruction from the user.

In step S711, the EC server 10 executes processing for shipping the ordered goods in response to the order instruction from the user. It will be assumed that the flow of ordering goods and executing charging processing with use of the EC service is implemented using known techniques, and thus a detailed description thereof will be omitted. This concludes the processing sequence.

As described above, information registered in the device registration processing (steps S508 to S519), which is executed to enable the use of the service of the EC service provider 1 from the image forming apparatus 30, is also used in the notification processing of step S708. Therefore, the user need not newly register device information for the sake of the notification processing (that is to say, the notification of promotion in step S708), and thus can enjoy improved usability.

[Prediction Processing]

The prediction processing according to the invention of the present application will now be described. Although the prediction processing is described as executed by the management server 20 herein, the prediction processing may be executed by another server (e.g., the EC server 10).

With use of status information collected from the image forming apparatus 30, the management server 20 grasps the degrees of consumption of consumables, such as inks, and predicts timings when the remaining amounts of consumables reach zero. Prior to this, times to change the consumables are identified, and in addition, times when an end user should order the consumables or products to be ordered are identified.

Figure 8:
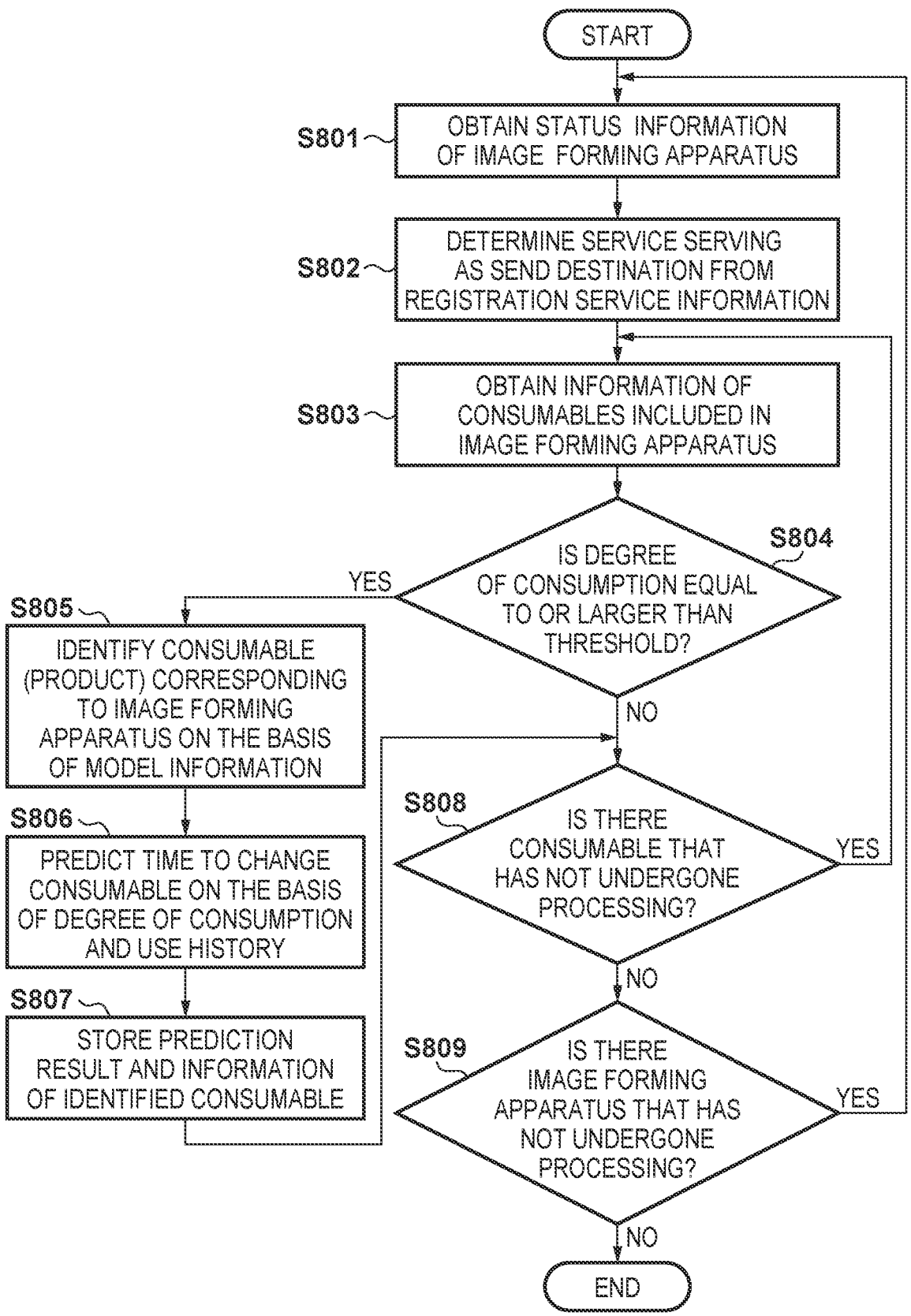
FIG. 8 is a flowchart of prediction processing according to the invention of the present application.

The following describes processing of FIG. 8, and this processing is implemented as the CPU 21 of the management server 20 reads out and executes a program stored in a storage unit. As described above, the present processing is based on the premise that the management server 20 collects status information from the image forming apparatus 30 and manages the same. As to the timing for starting the present processing, the present processing may be executed on a regular basis at a preset interval, or upon request from an external apparatus, for example. The present processing may be executed with respect to only a specific image forming apparatus, or with respect to all of the managed image forming apparatuses.

In step S801, the management server 20 obtains, from among pieces of status information of the managed image forming apparatuses, status information of an image forming apparatus targeted for the processing.

In step S802, the management server 20 determines a send destination of information related to the image forming apparatus targeted for the processing based on the status information. For example, when the status information contains a service ID that enables unique identification of a service, the send destination can be identified with reference to the service management table. Also when the status information contains a serial number that enables unique identification of an image forming apparatus, the send destination can be identified with reference to the service management table. In the description of the present embodiment, the system includes only one EC service provider 1 as shown in FIG. 1; however, the system may include a plurality of EC service providers as in the later-described second embodiment. When the system includes a plurality of EC service providers, the management server 20 needs to identify an EC service provider to which a result of the processing of FIG. 8 is to be sent. In the present embodiment, execution of processing of step S802 enables identification of an EC service provider to which the result of the processing of FIG. 8 is to be sent based on the status information obtained from the image forming apparatus 30. Note that information for identifying a provision destination of information is not limited to those described above, and may be other information as long as services and image forming apparatuses are registered in association with each other.

In step S803, the management server 20 obtains information related to consumables from the obtained status information. This information related to consumables indicates, for example, the remaining amounts of inks (e.g., the rates to the maximum volumes) and the remaining number of sheets of paper. In addition, identification information of inks may be obtained as the information related to consumables.

In step S804, the management server 20 determines whether the degree of consumption of a target consumable is equal to or larger than a predetermined threshold. Herein, predetermined thresholds may be set in one-to-one correspondence with consumables, ink colors, or models of the image forming apparatuses. Furthermore, the thresholds may be set in relation to the remaining amounts, or in relation to the rates to the maximum volumes. If the degree of consumption is equal to or larger than the threshold (YES of step S804), the processing proceeds to step S805; if the degree of consumption is smaller than the threshold (NO of step S804), the processing proceeds to step S808.

In step S805, the management server 20 identifies a consumable (product) compatible with the image forming apparatus targeted for the processing based on a model ID of the image forming apparatus. For example, when the degree of consumption of an ink of the image forming apparatus is equal to or larger than the threshold, an ink product compatible with the image forming apparatus is identified. The identified ink product may be, for example, an ink product of a specific color or an ink product including a set of inks of different colors. Note that the management server 20 can identify product information corresponding to model information of the image forming apparatus with reference to a managed table.

In step S806, the management server 20 predicts time to change the consumable based on the current degree of consumption of the consumable and a use history of the image forming apparatus targeted for the processing. For example, when the latest amount of used ink is large, there is a possibility that the amount of consumption of ink will tend to be large for a while. The use history is accumulated upon reception of the status information of the image forming apparatus, and managed in the management server 20. Note that information used in the prediction processing is not limited to information related to the image forming apparatus targeted for the processing, and may be information obtained from another image forming apparatus, or statistic information related to times of use of image forming apparatuses and to contents.

In step S807, the management server 20 stores a prediction result and information of the identified consumable to a storage unit in association with each other. Information thus stored is provided to a service provider (e.g., the EC server 10) as predicted information.

In step S808, the management server 20 determines whether a consumable that has not undergone the prediction processing is included among the consumables of the image forming apparatus targeted for the processing. If there is a consumable that has not undergone the prediction processing (YES of step S808), the processing returns to step S803 and is repeated for that consumable. For example, when the image forming apparatus targeted for the processing is of a model that is equipped with individual ink tanks of different colors, processing of step S803 is executed for each color. On the other hand, if the prediction processing has been completed for all of the consumables included in the image forming apparatus targeted for the processing (NO of step S808), the processing proceeds to step S809.

In step S809, the management server 20 determines whether there is an image forming apparatus that has not undergone the processing. If there is an image forming apparatus that has not undergone the processing (YES of step S809), the processing returns to S801 and is repeated for that image forming apparatus. On the other hand, if the processing has been completed for all of the image forming apparatuses (NO of step S809), the present processing flow is ended.

As described above, according to the present embodiment, it is possible to establish coordination among a plurality of service servers using status information of an image forming apparatus, thereby enabling promotion for consumables related to the image forming apparatus.

Second Embodiment

A second embodiment of the invention of the present application will now be described. In the following description of the present embodiment, a plurality of EC servers (a plurality of EC service providers) are provided, and a user can receive information related to appropriate goods from a plurality of sellers of consumables at appropriate timings.

In the first embodiment, a user registers user information and device information with an EC service provided by one EC service provider. In contrast, in the present embodiment, a user registers user information and device information with different EC services provided by different EC service providers.

As described using FIG. 5 in the first embodiment, a device registration request is sent from the image forming apparatus 30. In the present embodiment, in this registration, the image forming apparatus 30 presents EC services to a user in such a manner that the user can select an EC service with which the registration is to be performed. Then, a registration request is sent to the EC service selected by the user. It will be assumed that, in this registration processing, registration with a plurality of EC services is possible in accordance with a user operation. In sending a device registration request, if user registration with an EC service provider(s) has not been completed, the user may be encouraged to perform the user registration first.

Furthermore, status information sent by the image forming apparatus contains information related to an EC service(s) with which registration has been performed. Examples of this information related to the EC service(s) include a service ID(s) issued by the management server 20. The image forming apparatus is notified of this information in step S517 of FIG. 5 as described in the first embodiment. In this way, with use of the service ID(s) contained in the status information obtained in step S701, the management server 20 can identify the EC service provider(s) to which the status information and the result of prediction in FIG. 8 are to be provided (that is to say, step S802 can be implemented). Then, the management server 20 can provide the status information to the identified EC service provider(s).

Each of the plurality of EC service providers executes various types of processing based on the status information received from the management server 20. Examples of such processing include promotion notification processing described in the first embodiment.

The present embodiment can not only offer the advantageous effects of the first embodiment, but also enables a plurality of EC services to provide marketing for goods to an end user in accordance with a status of an image forming apparatus, thereby enabling the end user to make a purchase that is more suited for his/her needs through comparison among the plurality of EC services.

Third Embodiment

In recent years, a cloud print service (hereinafter, CP service) for executing print processing via a server on the Internet has been widely used. In light of this, the following describes a third embodiment that can make use of coordination with a CP service in addition to the above-described system configuration.

In the following description, it will be assumed that user registration and device registration are required to use a CP service, similarly to the above-described EC service, and such registrations are performed in a flow similar to the flow that has been described in relation to the EC service.

[System Configuration]

A configuration of a server that provides a CP service (hereinafter, a CP server) will now be described. It will be assumed that a hardware configuration of the CP server is similar to those of other servers described using FIG. 3, and thus a detailed description thereof will be omitted. Furthermore, in the following description, it will be assumed that the CP server operates in coordination with the above-described EC server 10 and is provided by the EC service provider.

Figure 10:
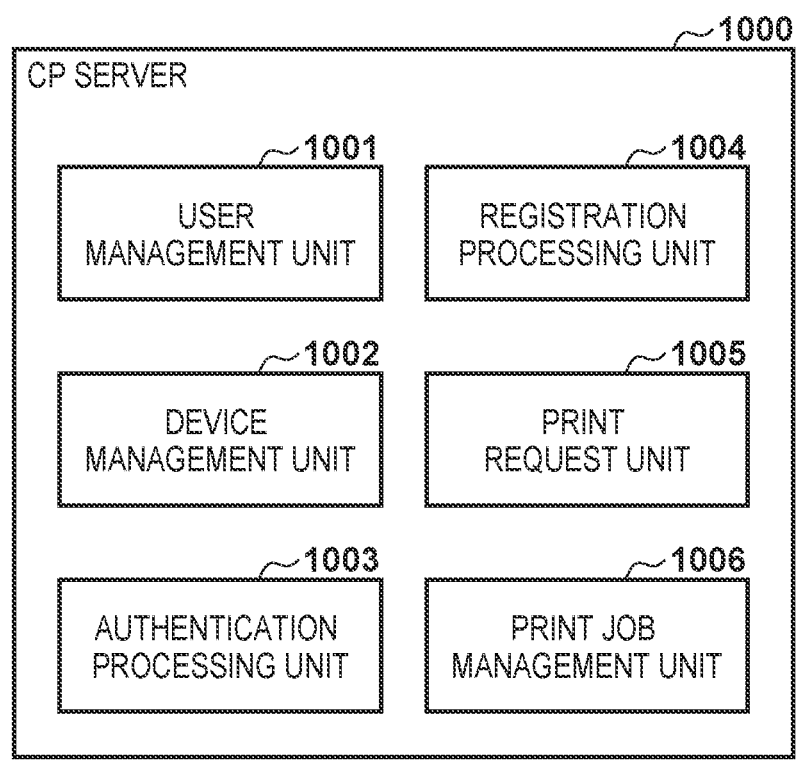
FIG. 10 shows an example of a software configuration of a CP server according to the invention of the present application.

The following describes an example of a software configuration of a CP server 1000 using FIG. 10. The CP server 1000 includes a user management unit 1001, a device management unit 1002, an authentication processing unit 1003, a registration processing unit 1004, a print request unit 1005, and a print job management unit 1006. The user management unit 1001 manages information of a user of the CP service. The device management unit 1002 manages information of a device (image forming apparatus) used in the CP service. Herein, the device management unit 1002 manages an image forming apparatus and a user in association with each other. The associated user is, for example, an owner of the image forming apparatus. The authentication processing unit 1003 executes authentication processing with use of authentication information (e.g., a user ID and a password) when, for example, the CP service is used. In response to a request from a user, the registration processing unit 1004 executes processing for registering a user of the CP service and a device. The user and the device thus registered are respectively managed by the user management unit 1001 and the device management unit 1002. In response to a request from a user, the print request unit 1005 generates a print job, and requests an image forming apparatus to execute the generated print job. The print job management unit 1006 manages the print job generated by the print request unit 1005.

The following describes examples of structures of tables managed by the CP server 1000 using FIGS. 12DA to 12DC. The CP server 1000 holds a user management table, a device management table, and a print job management table.

The user management table shown in FIG. 12DA manages information related to users of the CP service, and contains user IDs, passwords, user names, e-mail addresses, physical addresses, payment information, and device IDs. Note that these pieces of information may be managed as copies of pieces of information shown in FIG. 12AA. The CP server 1000 may share the pieces of information shown in FIG. 12AA with the EC server 10.

When the CP server 1000 executes registration processing separately from the EC server 10, the CP server 1000 executes processing for generating the table shown in FIG. 12DA containing the following pieces of information. The user IDs are identification information for uniquely identifying users of the CP service provided by the CP server 1000, and issued by the CP server 1000 at the time of user registration. The passwords are authentication information used in user authentication. The user names, e-mail addresses, physical addresses, and payment information are input as personal information of the users at the time of user registration. The device IDs are identification information for uniquely identifying devices (image forming apparatuses) associated with the users, and it will be assumed that the users perform various print operations using these image forming apparatuses. For example, it will be assumed that a user can print content data provided by the content server 40 by designating an associated image forming apparatus. One or more image forming apparatuses can be associated with one user.

The device management table shown in FIG. 12DB manages information of devices used in the CP service, and contains device IDs, registration IDs, serial numbers, and status information. The device IDs are identification information for uniquely identifying registered devices, and issued by the CP server 1000 at the time of device registration. The registration IDs are information that is used at the time of device registration, and it will be assumed that they are used in a manner similar to the way they are used by the EC server 10. The serial numbers are assigned to the devices by a manufacturer of the devices. The status information is set based on information obtained from the management server, and stores, for example, information indicating the activation statuses of the image forming apparatuses and the degrees of consumption of consumables.

The print job management table shown in FIG. 12DC manages print jobs related to the CP service that have been generated in response to requests from the users, and contains job IDs, requesters, send destination devices, job statuses, and dates/times of generation. The job IDs are identification information for uniquely identifying the print jobs, and issued by the CP server 1000 when the print jobs are generated. The requesters indicate users who requested the print jobs; herein, they correspond to the user IDs managed in the user management table. The send destination devices indicate image forming apparatuses that process the print jobs, and the print jobs are sent to these indicated image forming apparatuses. The send destination devices correspond to the device IDs managed in the device management table (FIG. 12DB). The job statuses indicate processing statuses of the image forming apparatuses. The dates/times of generation indicate the dates/times of generation of the print jobs.

[Flow of Printing]

The following describes the flow of print processing in the system according to the invention of the present application using FIG. 11.

In step S1101, a user issues a login request to the CP server 1000 via the web browser 501 of the mobile terminal 50. Note that the user may issue the login request to the EC server 10, and the CP server may take over print processing of the EC server 10.

In step S1102, the CP server 1000 generates an authentication screen in response to the login request.

In step S1103, the CP server 1000 provides the generated authentication screen to the mobile terminal 50.

In step S1104, the mobile terminal 50 displays the authentication screen received from the CP server 1000, and the user inputs user information (a user ID and a password) to the authentication screen.

In step S1105, the mobile terminal 50 sends the input user information to the CP server 1000.

In step S1106, the CP server 1000 executes authentication processing with use of the user information received from the mobile terminal 50 and user information held therein. Then, the CP server 1000 notifies the mobile terminal 50 of a result of the authentication processing in step S1107. Below, the description continues with the assumption that the authentication processing has succeeded.

After the authentication processing has been normally completed, the user sends a print request to the CP server 1000 via the mobile terminal 50 in step S1108. It will be assumed that the sent print request contains print-related information. Note that this print-related information may indicate print settings, image data used in print processing, document data, and a storage location of data used in the print processing.

In step S1109, in response to the received print request, the CP server 1000 generates a print job based on the print-related information designated in the received print request. The CP server 1000 also identifies, from among registered image forming apparatuses, an image forming apparatus associated with the user who sent the print request. For example, provided that the user who is logged in is "CPU0001," the CP server 1000 identifies an image forming apparatus with a device ID "CPD0001" as a send destination of the print job. At this time, if a plurality of image forming apparatuses are detected, the CP server 1000 may send, to the mobile terminal 50, a selection screen for making the user select an image forming apparatus to be used, and accept the user's selection. Alternatively, the print request sent from the mobile terminal 50 may contain, in advance, information of an image forming apparatus to be used.

In step S1110, the CP server 1000 sends the generated print job to the identified image forming apparatus. The sent print job may have been edited to, for example, contain user information.

In step S1111, the image forming apparatus 30 executes print processing in accordance with the print job received from the CP server 1000.

In step S1112, the image forming apparatus 30 notifies the CP server 1000 of a result of the print processing that has been executed in accordance with the print job.

In step S1113, the image forming apparatus 30 notifies the user (mobile terminal 50) who requested the print job of the result of the print processing that has been executed in accordance with the print job. It will be assumed that information related to this notification destination is contained in the print job that was sent from the CP server 1000 to the image forming apparatus 30. Note that the result of the print processing is not limited to being sent from the image forming apparatus 30 directly to the mobile terminal 50, and the CP server 1000 that has been notified of the result of the print processing may notify the user (mobile terminal 50) of the same. In this case, the print job sent in step S1110 need not contain the information related to the notification destination, that is to say, the user. This concludes the sequence in the CP service.

Although the present embodiment has introduced cloud print processing that uses the CP server 1000, the CP server 1000 can be replaced with the EC server 10 when the EC server 10 has the functions of the CP server 1000. Furthermore, the CP server 1000 and the EC server 10 may be provided by the same service provider, or by different service providers.

Fourth Embodiment

The following describes a fourth embodiment, which is another embodiment for identifying a send destination of status information that the management server 20 has collected from an image forming apparatus.

In the first embodiment, when registration of the image forming apparatus 30 with the EC server 10 has been normally completed, the image forming apparatus 30 is notified of a device ID and a user ID in step S517 of FIG. 5. In the present embodiment, the image forming apparatus 30 further registers, with the management server 20, information of which it has been notified by a service server (e.g., the EC server 10) in association with its own identification information. The image forming apparatus 30 sends status information to the management server 20 together with a device ID (or user ID). In this way, when status information contains a device ID (or user ID), the management server 20 can identify a provision destination of the status information (a service server) with use of the contained device ID and pre-registered information. The management server 20 can also send the status information containing the device ID (or user ID) to a service server; this enables the service server to identify a user serving as a send destination of various notifications based on such status information and managed information.

Fifth Embodiment

In the above-described embodiments, the EC server 10 manages serial numbers. The present embodiment introduces an example in which the EC server 10 issues a notification of promotion without managing serial numbers. In the present embodiment, portions that are different from the above-described embodiments will be elaborated, but other common portions are still incorporated in the present embodiment.

First, in the present embodiment, the processing of FIG. 5 is executed. Steps S501 to S507, S510 to S515, and S517 to S519 are the same as those in the first embodiment. In step S508, the image forming apparatus 30 requests the EC server 10 for device registration in response to an instruction input by a user via the UI unit 35. At this time, the image forming apparatus 30 sends a registration request containing its own identification information (device identification information that is different from a serial number).

In step S509, the EC server 10 generates a device registration screen. At this time, the EC server 10 issues a registration ID and a device ID, and manages them in association with the device identification information.

In step S516, with use of the registration ID contained in the URL, the EC server 10 identifies a device ID associated with the registration ID. Then, the EC server 10 sets the identified device ID in association with the user ID targeted for authentication.

The foregoing processing enables the EC server 10 to associate a user ID and a device ID with each other without managing a serial number of the image forming apparatus 30.

After the processing of FIG. 5, the processing of FIG. 7 is executed similarly to the first embodiment.

As described above, in the present embodiment, the processing of FIG. 7 can be executed without managing serial numbers in the EC server 10.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2015-248030, filed Dec. 18, 2015, which is hereby incorporated by reference herein in its entirety.

What is claimed is:

1. A system, comprising:
an image forming apparatus; and
a management server for managing status information of the image forming apparatus,
wherein the image forming apparatus includes:
(1) a request unit configured to, in a state that user information is managed by a service server providing a web service, request the service server to register device information of the image forming apparatus,
(2) a first receiving unit configured to receive authentication screen information for the image forming apparatus as a response to a request by the request unit;
(3) a second receiving unit configured to receive device identification information from the service server based on an input of the user information on an authentication screen for the image forming apparatus corresponding to the authentication screen information for the image forming apparatus received by the first receiving unit, wherein the device identification information and the user information are managed in association with each other by the service server; and
(4) a first sending unit configured to send status information of the image forming apparatus and the device identification information received by the second receiving unit to the management server,
wherein the management server includes a second sending unit configured to send the device identification information and information based on the status information to the service server,
wherein when the device identification information and the information based on the status information are sent to the service server, the service server performs a notification corresponding to information based on the status information using user information managed in association with the device identification information by the service server,
wherein the request unit, the first receiving unit, the second receiving unit, and the first sending unit are implemented by at least one processor of the image forming apparatus, and
wherein the second sending unit is implemented by at least one processor of the management server.

2. The system according to claim 1, wherein information related to sales of a consumable included in the image forming apparatus in accordance with a degree of consumption of the consumable predicted based on the status information is notified using the user information.

3. The system according to claim 1, further comprising a content server for providing a content service, the content server comprising:
a presentation unit configured to present, to a user of the content service, information related to an image forming apparatus that is purchasable on the web service, and
an ordering unit configured to place an order for the image forming apparatus with the service server in response to acceptance of an instruction from the user for purchasing the image forming apparatus, based on the information presented by the presentation unit,
wherein the presentation unit and the ordering unit are implemented by at least one processor of the content server.

4. The system according to claim 1, wherein the management server further comprises a prediction unit configured to predict time to change a consumable included in the image forming apparatus using the status information of the image forming apparatus, and
wherein the prediction unit is implemented by the at least one processor of the management server.

5. The system according to claim 1, wherein the service server identifies a product compatible with the image forming apparatus using information based on the status information obtained from the management server, the product being a consumable to be changed.

6. The system according to claim 1, wherein the first sending unit of the image forming apparatus is configured to send the status information including identification information for uniquely identifying the service server that has registered the device identification information, and
wherein the management server is configured to identify the service server based on the identification information that is included in the status information for identifying the service server.

7. The system according to claim 1, wherein the user information includes an e-mail address.

8. The system according to claim 1, wherein the user information includes an address.

9. A control method for a system that includes (a) an image forming apparatus, and (b) a management server that manages status information of the image forming apparatus, the control method comprising:
 (A) in the image forming apparatus,
  (1) in a state that user information is managed by a service server providing a web service, requesting the service server to register device information of the image forming apparatus,
  (2) receiving authentication screen information for the image forming apparatus as a response to a request in the requesting,
  (3) receiving device identification information from the service server based on an input of the user information on an authentication screen for the image forming apparatus corresponding to the received authentication screen information for the image forming apparatus, wherein the device identification information and the user information are managed in association with each other by the service server, and
  (4) sending status information of the image forming apparatus and the received device identification information to the management server, and
 (B) in the management server, sending the device identification information and information based on the status information to the service server,
 wherein when the device identification information and the information based on the status information are sent to the service server, the service server performs a notification corresponding to information based on the status information using user information managed in association with the device identification information by the service server.

10. The control method according to claim 9, wherein information related to sales of a consumable included in the image forming apparatus in accordance with a degree of consumption of the consumable predicted based on the status information is notified using the user information.

11. The control method according to claim 9, wherein the system further includes a content server that provides a content service, and
 wherein the control method further comprises:
 in the content server,
  (A) presenting, to a user of the content service, information related to an image forming apparatus that is purchasable on the web service; and
  (b) placing an order for the image forming apparatus with the service server when an instruction from the user for purchasing the image forming apparatus has been accepted, based on the information presented in the presenting.

12. The control method according to claim 9, further comprising:
 in the management server, predicting time to change a consumable included in the image forming apparatus using the status information of the image forming apparatus.

13. The control method according to claim 9, further comprising:
 in the service server, identifying a product compatible with the image forming apparatus using information based on the status information obtained from the management server, the product being a consumable to be changed.

14. The control method according to claim 9, wherein in the image forming apparatus, the status information including identification information for uniquely identifying the service server that has registered the device identification information is sent, and
 wherein in the management server, the service server is identified based on the identification information that is included in the status information for identifying the service server.

15. The control method according to claim 9, wherein the user information includes an e-mail address.

16. The control method according to claim 9, wherein the user information includes an address.

* * * * *